(12) United States Patent
Dadoo et al.

(10) Patent No.: US 12,321,699 B2
(45) Date of Patent: Jun. 3, 2025

(54) COMPUTING SYSTEMS AND METHODS FOR FACILITATING ENGAGEMENT VIA DIRECT MAIL

(71) Applicant: Discover Financial Services, Riverwoods, IL (US)

(72) Inventors: Tarun Dadoo, Vernon Hills, IL (US); Sharif Refaie, Orland Park, IL (US); Benjamin Wolff, Chicago, IL (US); Ian Huntley, Chicago, IL (US); Sanjeev Khatri, Des Plaines, IL (US)

(73) Assignee: Discover Financial Services, Riverwoods, IL (US)

( * ) Notice: Subject to any disclaimer, the term of this patent is extended or adjusted under 35 U.S.C. 154(b) by 207 days.

(21) Appl. No.: 17/887,200

(22) Filed: Aug. 12, 2022

(65) Prior Publication Data
US 2023/0334242 A1    Oct. 19, 2023

Related U.S. Application Data

(60) Provisional application No. 63/331,254, filed on Apr. 14, 2022.

(51) Int. Cl.
*G06F 40/279* (2020.01)
*G06F 40/237* (2020.01)
*G06Q 40/03* (2023.01)

(52) U.S. Cl.
CPC .......... *G06F 40/279* (2020.01); *G06F 40/237* (2020.01); *G06Q 40/03* (2023.01)

(58) Field of Classification Search
CPC ...... G06F 40/279; G06F 40/237; G06F 21/46; G06F 40/253; G06F 40/284; G06F 40/289; G06Q 40/03
See application file for complete search history.

(56) References Cited

U.S. PATENT DOCUMENTS

| | | | | |
|---|---|---|---|---|
| 7,783,476 | B2* | 8/2010 | Yang | G06F 40/237 715/264 |
| 10,423,775 | B1* | 9/2019 | Kane-Parry | G06F 21/46 |
| 2005/0198537 | A1* | 9/2005 | Rojewski | H04L 9/3226 726/19 |
| 2007/0101151 | A1* | 5/2007 | Little | G06F 21/46 713/184 |
| 2019/0104120 | A1* | 4/2019 | Arrowood | G06F 21/32 |
| 2020/0251118 | A1* | 8/2020 | Sunkavally | G10L 17/04 |

* cited by examiner

*Primary Examiner* — Abul K Azad
(74) *Attorney, Agent, or Firm* — Lee Sullivan Shea & Smith LLP

(57) ABSTRACT

A computing platform is configured to: (i) obtain a pool of available words for use in generating four-word passphrases, (ii) generate a candidate batch of four-word passphrases using the pool of available words, (iii) identify one or more duplicate four-word passphrases in the candidate batch and then filter the identified one or more duplicate four-word passphrases out of the candidate set; (iv) based on the filtered candidate batch of four-word passphrases, generate a new batch of four-word passphrases for use on direct mail; and (v) release the new batch of four-word passphrases for use on direct mail.

20 Claims, 21 Drawing Sheets

ACTIVE PASSPHRASES TABLE 603

| PASSPHRASE | NO-SPACE | ALPHA-ORDERED | DATE GENERATED | STATUS | DATE RELEASED | DATE OF EXPIRATION |
|---|---|---|---|---|---|---|
| lime orange berry kiwi | limeorangeberrykiwi | berrykiwilimeorange | 12/15/2021 | Released | 1/1/2022 | 4/1/2023 |
| purposely ingot book pencil | purposelyingotbookpencil | bookingotpencilpurposely | 5/1/2022 | Unreleased | | |
| wheel chair tube mouse | wheelchairtubemouse | chairmousetubewheel | 5/1/2022 | Unreleased | | |
| picture flash lens control | pictureflashlenscontrol | controlflashlenspicture | 12/15/2021 | Released | 1/1/2022 | |
| pasta zeal mother engine | pastazealmotherengine | enginemotherpastazeal | 2/1/2022 | Unreleased | | |
| play fully ingot herstory | playfullyingotherstory | fullyherstoryingotplay | 12/15/2021 | Released | 1/1/2022 | 4/1/2023 |
| science math history recess | sciencemathhistoryrecess | historymathrecessscience | 2/1/2022 | Unreleased | | |
| yuzu indigo orange lime | yuzuindigoorangelime | indigolimeorangeyuzu | 5/1/2022 | Unreleased | | |
| story playful other lying | storyplayfulotherlying | lyingotherplayfulstory | 1/1/2022 | Released | 1/15/2022 | 4/15/2023 |
| purpose lying tortoise sky | purposelyingtortoisesky | lyingpurposesskytortoise | 1/1/2022 | Released | 1/15/2022 | 4/15/2023 |

FIG. 6B

RELEASED PASSPHRASES TABLE 604

| PASSPHRASE | DATE RELEASED | DATE VALID UNTIL | STATUS | ASSIGNMENT |
|---|---|---|---|---|
| lime orange berry kiwi | 1/1/2022 | 4/1/2022 | Assigned | Recipient Information |
| purposely ingot book pencil | 6/1/2022 | 9/1/2022 | Unassigned | - |
| wheel chair tube mouse | 6/1/2022 | 9/1/2022 | Unassigned | - |
| picture flash lens control | 1/1/2022 | 4/1/2022 | Assigned | Recipient Information |
| . . . | | | | |
| pasta zeal mother engine | 3/1/2022 | 6/1/2021 | Assigned | Recipient Information |
| play fully ingot herstory | 1/1/2022 | 4/1/2022 | Assigned | Recipient Information |
| science math history recess | 3/1/2022 | 6/1/2021 | Assigned | Recipient Information |
| yuzu indigo orange lime | 6/1/2022 | 9/1/2022 | Unassigned | - |
| story playful other lying | 1/1/2022 | 4/1/2022 | Assigned | Recipient Information |
| purpose lying tortoise sky | 1/15/2022 | 4/15/2021 | Invalid | - |

FIG. 6C

DIRECT MAIL DATA SET 605

| RECIPIENT NAME | RECIPIENT ADDRESS | OFFER INFO | PASSPHRASE |
|---|---|---|---|
| First Name Last Name | Address | 0% APR for XX months | lime orange berry kiwi |
| First Name Last Name | Address | 0% APR for XX months | purposely ingot book pencil |
| First Name Last Name | Address | 0% APR for XX months + CASH BONUS | wheel chair tube mouse |
| First Name Last Name | Address | 0% APR for XX months | picture flash lens control |
| . . . | . . . | . . . | . . . |
| First Name Last Name | Address | 0% APR for XX months | play fully ingot herstory |
| First Name Last Name | Address | 0% APR for XX months + CASH BONUS | science math history recess |
| First Name Last Name | Address | 0% APR for XX months + CASH BONUS | yuzu indigo orange lime |
| First Name Last Name | Address | 0% APR for XX months | story playful other lying |
| . . . | . . . | . . . | . . . |

FIG. 6D

Apply today

Visit Discover.com/itcash
Call 1-800-756-4336
Apply with your personalized 4-word invitation code.
Respond by April 23, 2022.
Your 4-word invitation code:

| alpha | delta | omega | upsilon | or

Scan this code—
we'll pre-fill your
application info.

Your family will enjoy great savings, too:

0% INTRO APR
on purchases for
XX MONTHS

Then your standard variable
purchase APR applies, currently
XX.XX%*

*See enclosed for important information which includes rates, fees, FICO® Credit Score terms, other cost information and Rewards. Reward terms and conditions may change.

You can choose to stop receiving "prescreened" offers of credit from this and other companies by calling toll-free (888) 567-8688. See PRE-SCREEN & OPT-OUT NOTICE enclosed for more information about prescreened offers.

FIG. 7

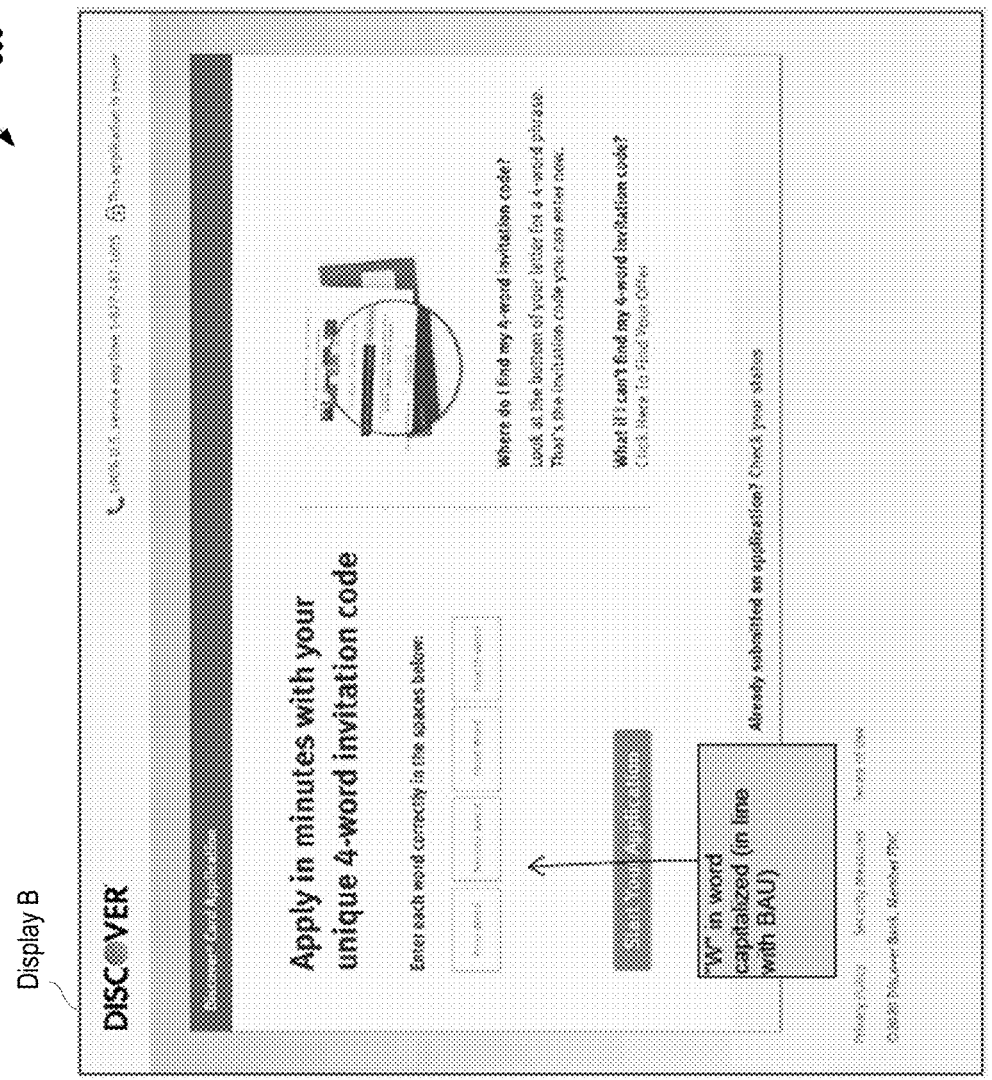
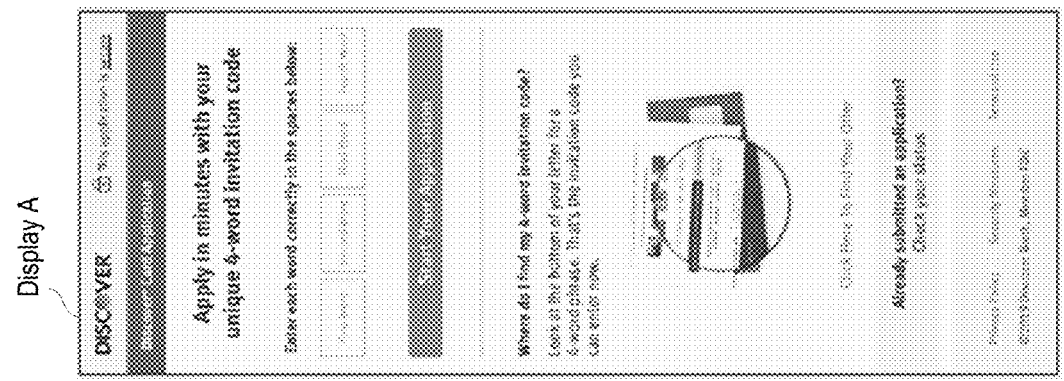
FIG. 8A

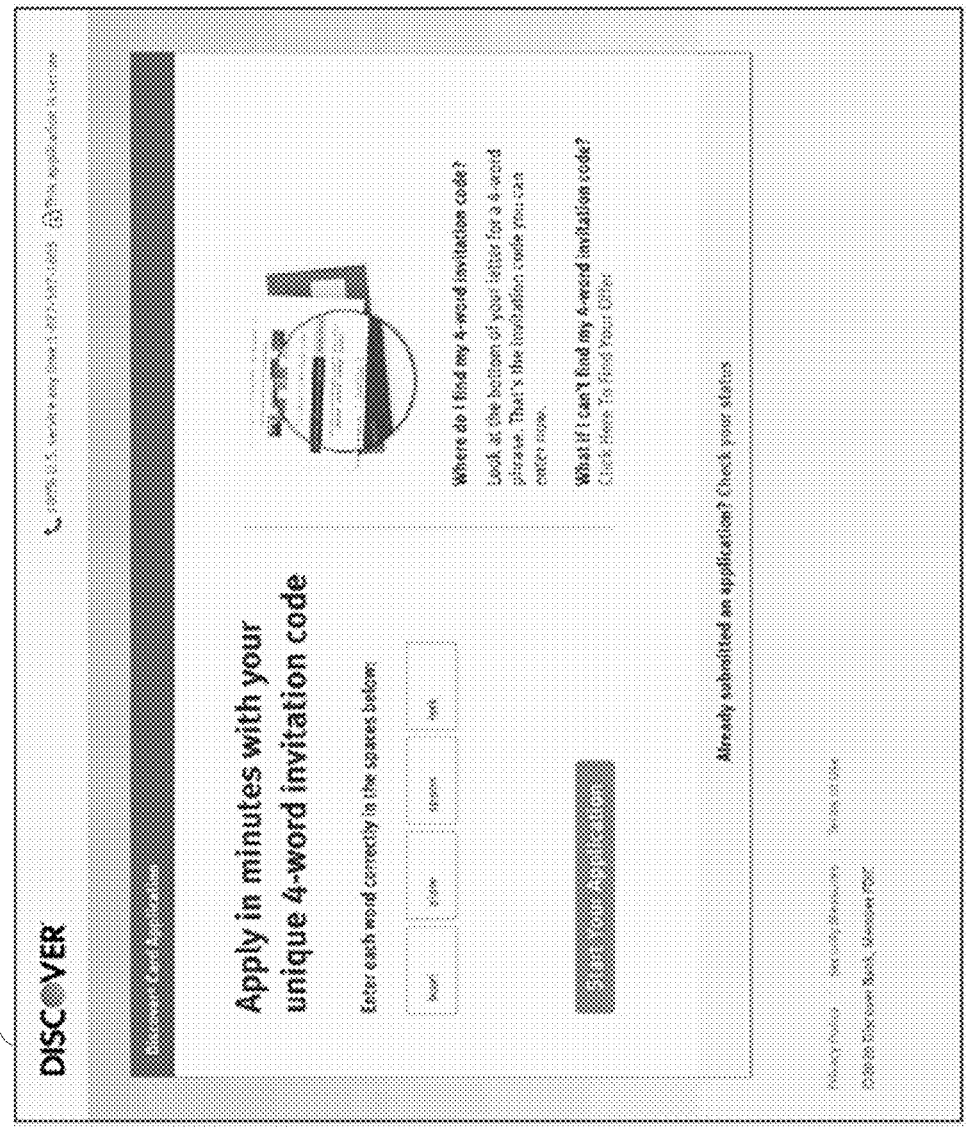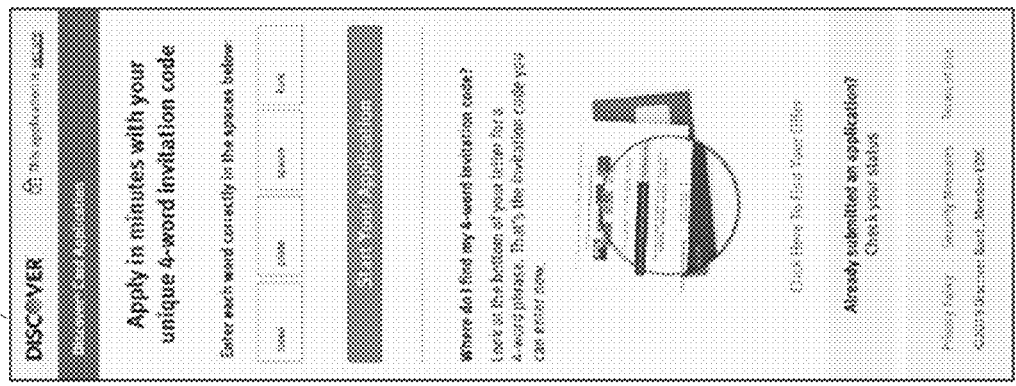
FIG. 8B

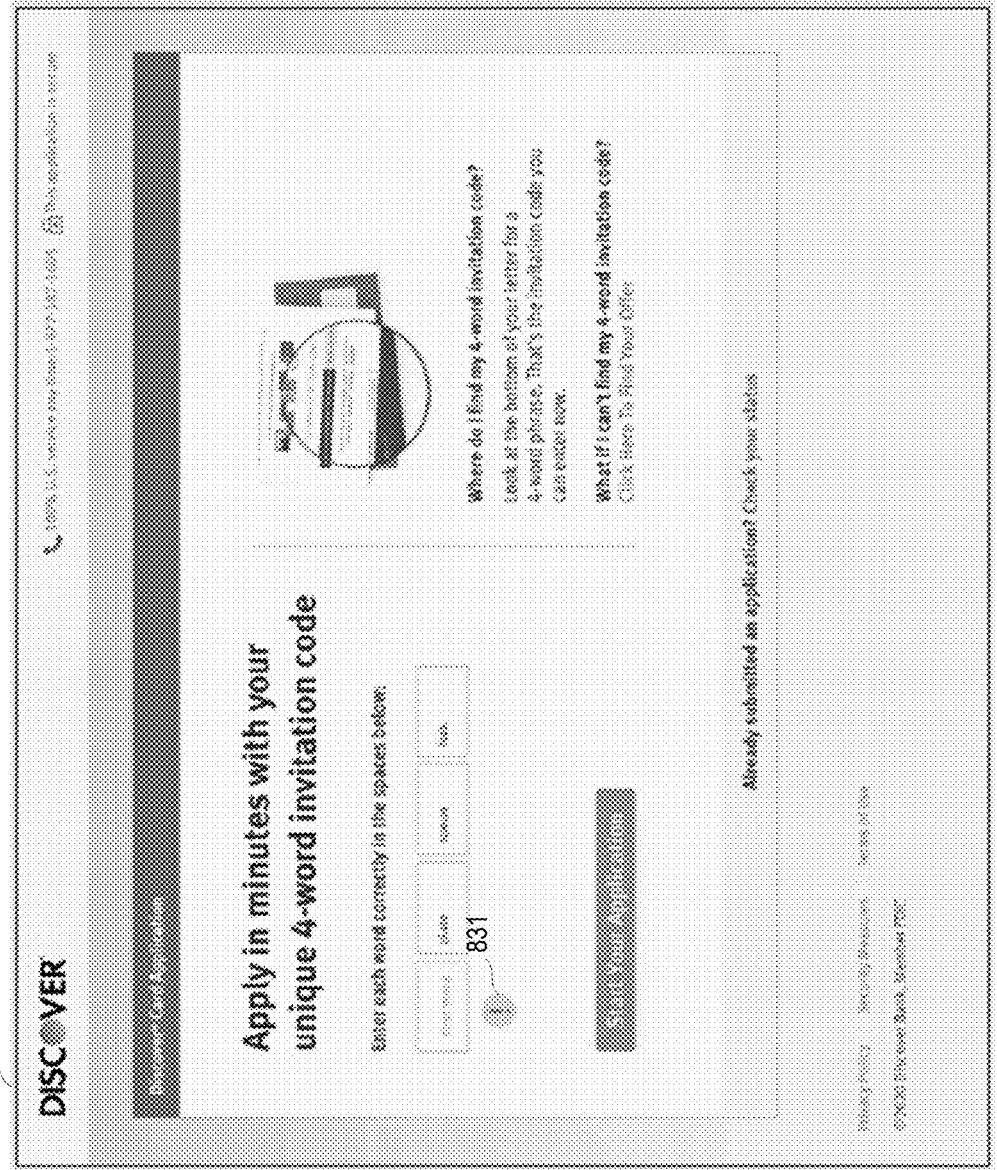
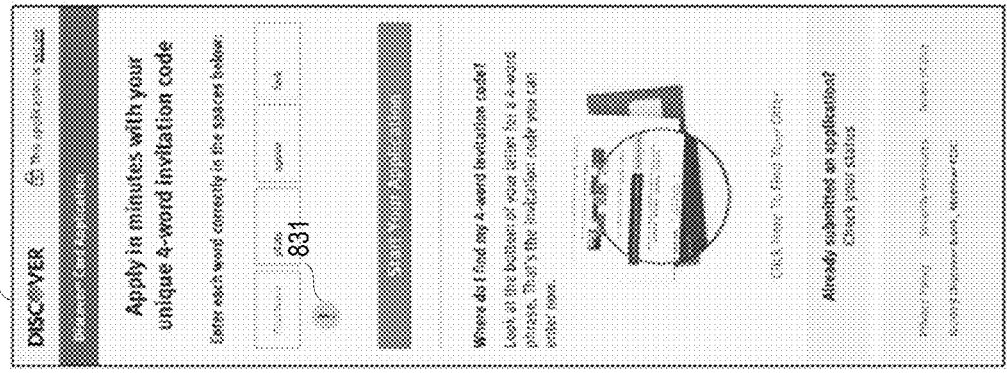
FIG. 8C

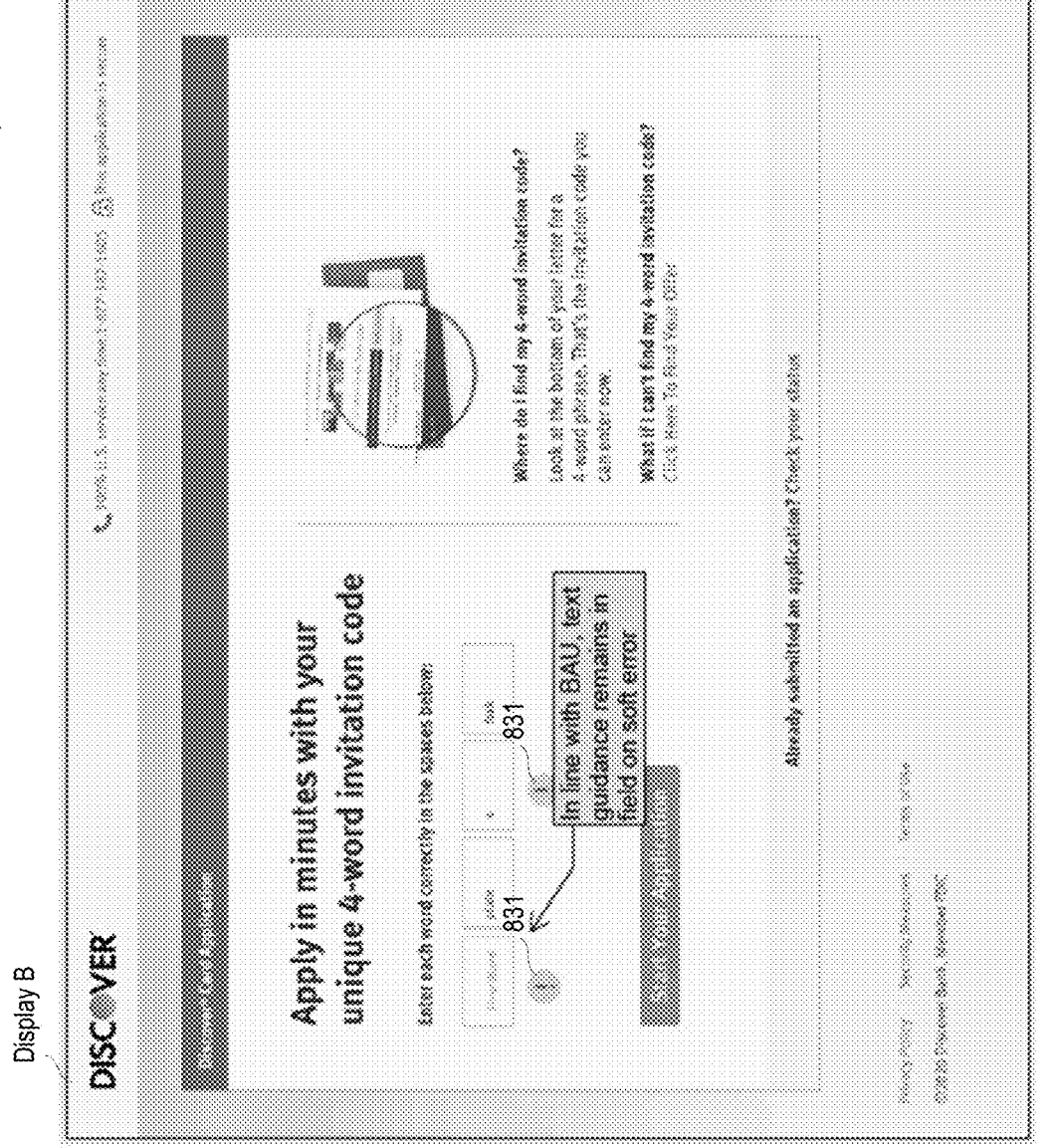
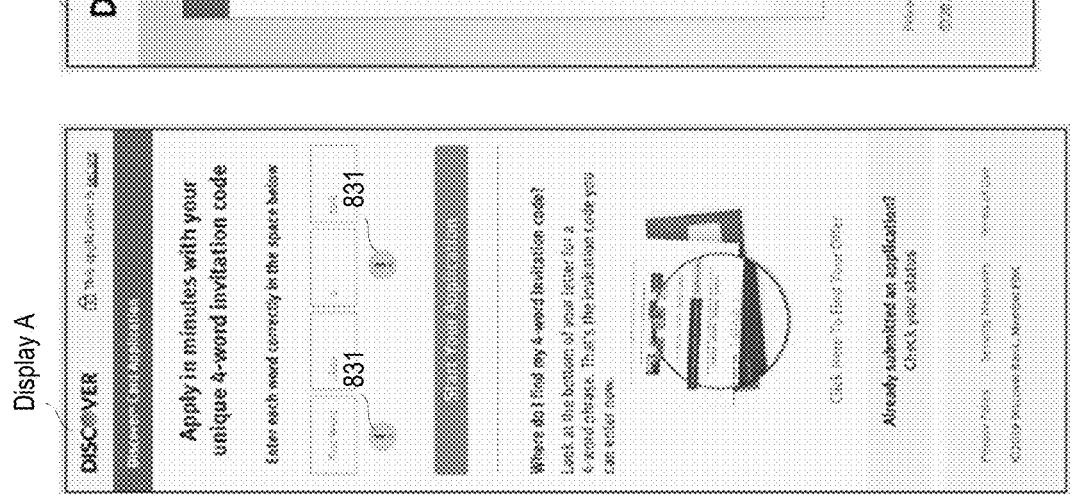
FIG. 8D

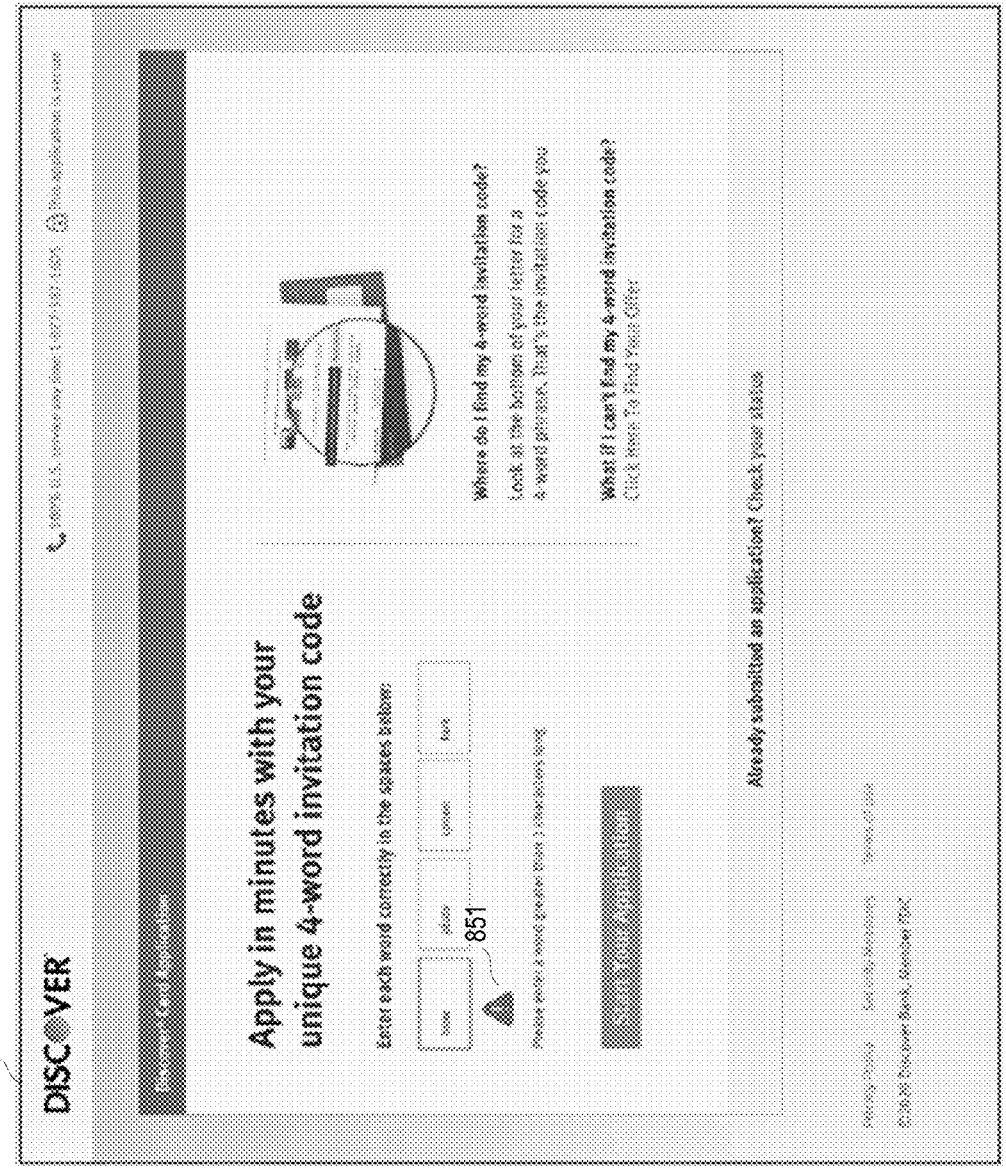
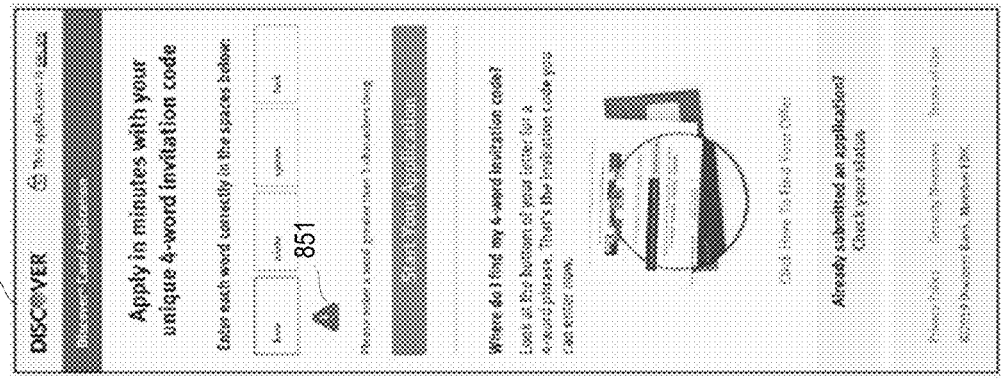
FIG. 8E

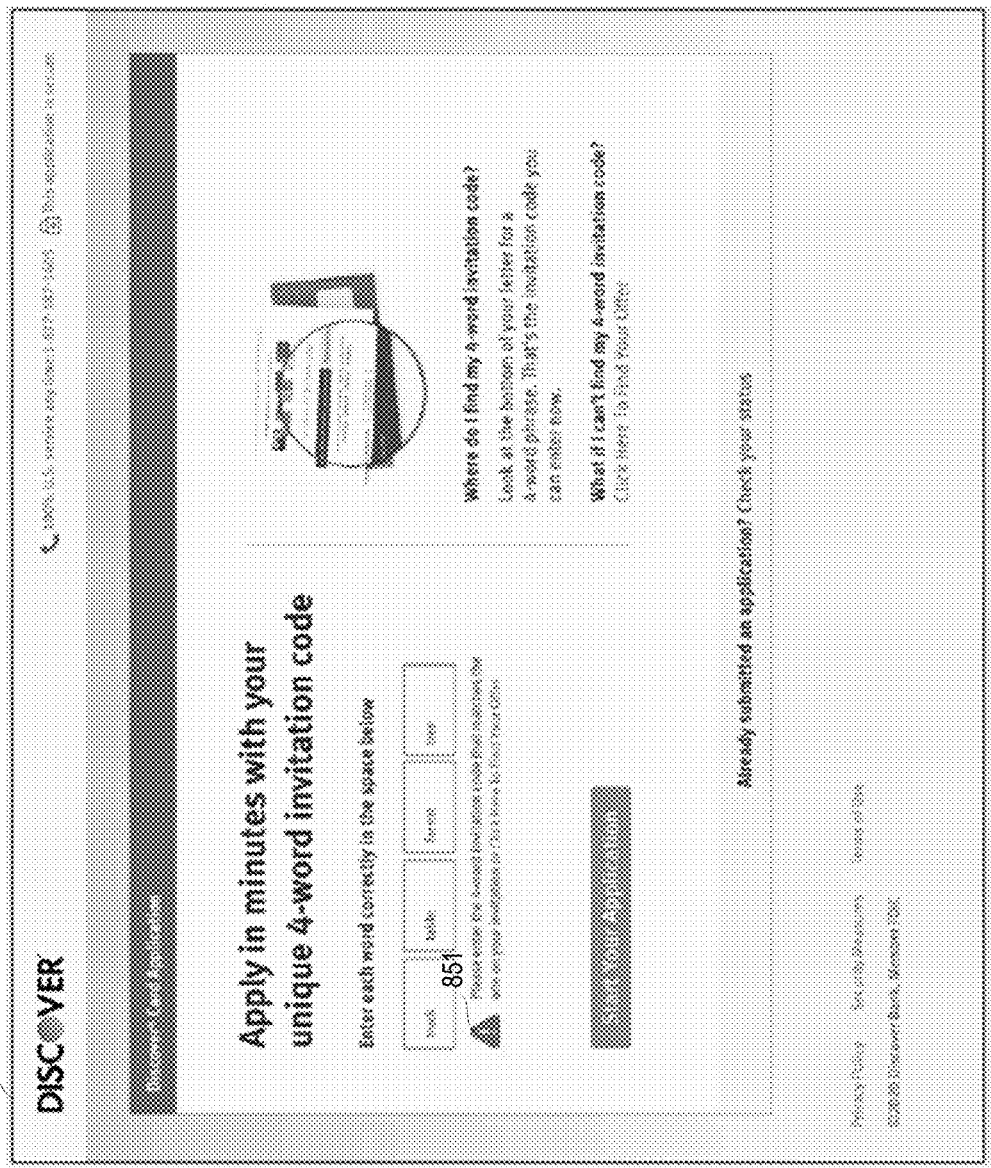
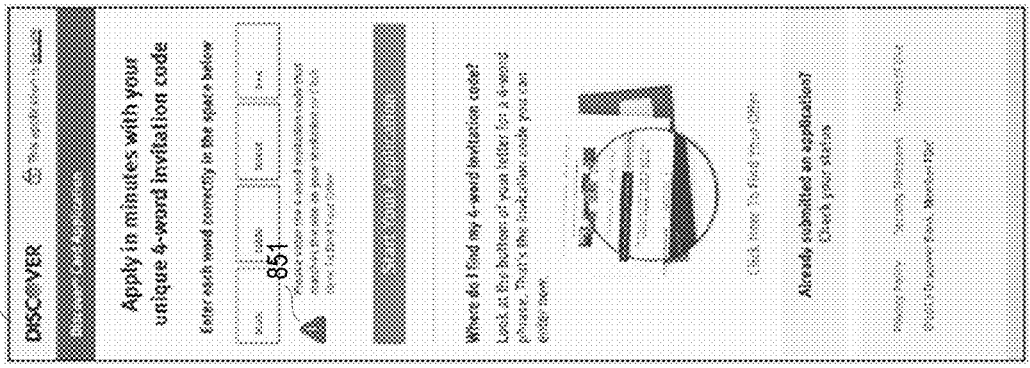
FIG. 8H

COMPUTING SYSTEMS AND METHODS FOR FACILITATING ENGAGEMENT VIA DIRECT MAIL

CROSS-REFERENCE TO RELATED APPLICATIONS

This application claims priority under 35 U.S.C. § 119(e) to U.S. Provisional Application No. 63/331,254, filed on Apr. 14, 2022, and titled "Computing Systems and Methods for Facilitating Engagement via Direct Mail," which is incorporated by reference herein in its entirety.

BACKGROUND

Business organizations engage with potential customers in various ways. One way that a business organization may engage with potential customers is by generating and sending what is often referred to as "direct mail." For instance, a financial services company may generate and send out direct mail to potential customers of certain services offered by the financial services company, such as credit card services. This type of direct mail may inform the potential customers about a service that is being offered by financial services company and invite the potential customers to submit an application for that service—perhaps along with indicating that the potential customers have been "pre-approved" for that service.

Along similar lines, a nonprofit organization may use direct mail to engage with potential donors for purposes of seeking monetary contributions to the nonprofit organization. This type of direct mail may inform the potential donors about the nonprofit organization and its mission and invite the potential donors to make a monetary contribution to the nonprofit organization.

Many other uses of direct mail are possible as well.

BRIEF DESCRIPTION OF THE DRAWINGS

FIG. 6B depicts an example set of active passphrases and associated information that may be stored by a direct mail system in accordance with the disclosed technology.

FIG. 6C depicts an example set of passphrases that have been released for use on direct mail and associated information that may be stored by a direct mail system in accordance with the disclosed technology.

FIG. 6D depicts an example set of information that may be used to generate direct mail in accordance with the disclosed technology.

FIG. 7 depicts an example piece of direct mail including a passphrase generated in accordance with the disclosed technology.

FIGS. 8A-8I depict example views of a web interface for facilitating interaction with intended recipients using a passphrase generated in accordance with the disclosed technology.

Figure 1:
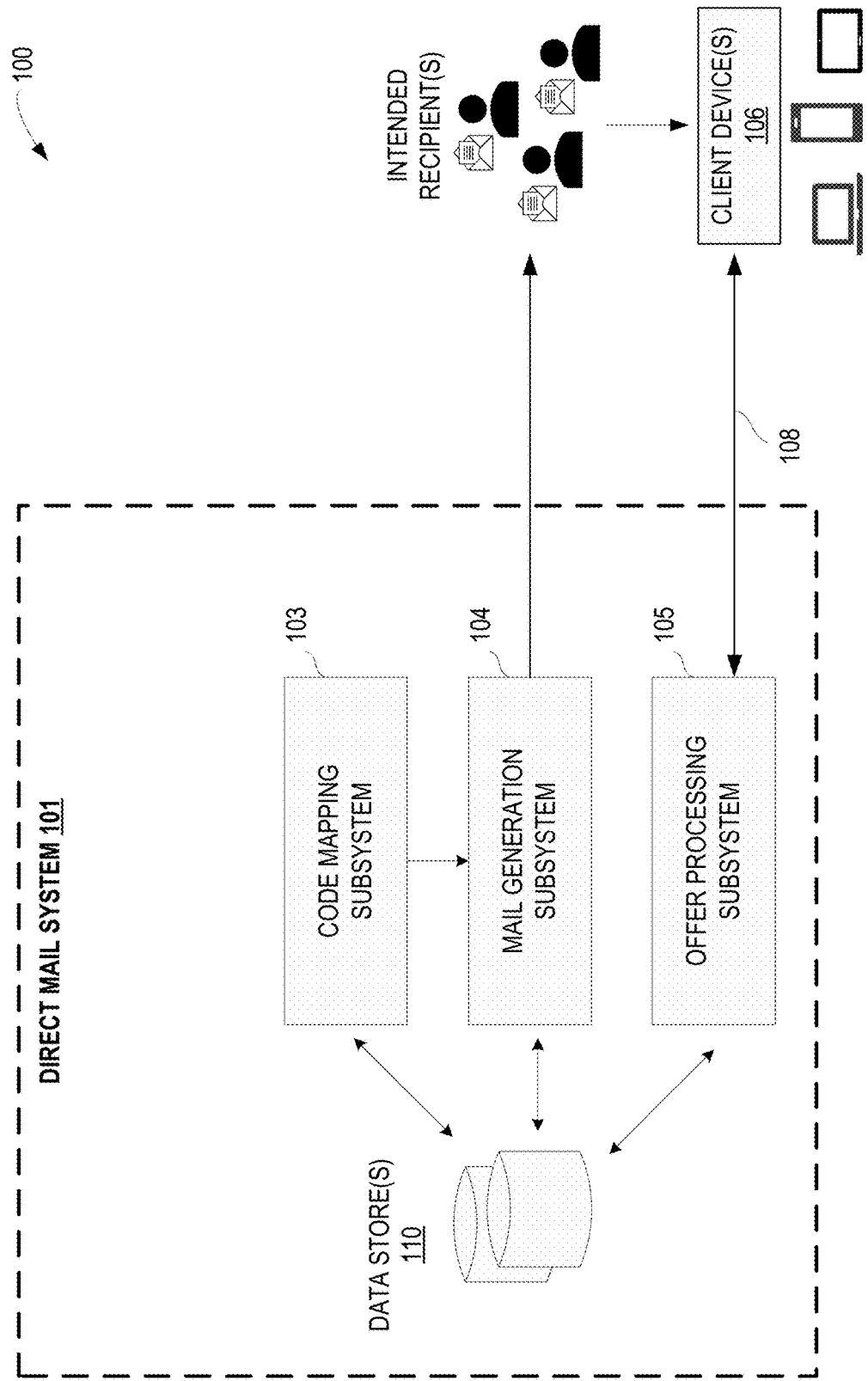
FIG. 1 depicts an example system configuration including an example direct mail system.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

Disclosed herein is new technology for improving the process of engaging with individuals via direct mail. The disclosed technology may be carried out by any organization that is interested in using direct mail to engage with a target audience, examples of which may include a business organization seeking to engage with potential customers of goods or services offered by the business organization or a nonprofit organization seeking to engage with potential donors, among other possibilities.

The approaches for engaging with individuals via direct mail that exist today have various limitations. According to one such approach, a computing system of an organization interested in engaging with individuals via direct mail (or a third-party organization that is working at the direction of the organization seeking to send the direct mail) may be configured to generate long, random numeric or alphanumeric codes—sometimes referred to as "invitation codes"—and assign those invitation codes to intended recipients of the direct mail. In turn, those invitation codes will be included on the direct mail that is generated, printed, and sent out to the intended recipients. One possible example of such an invitation code may take the form of "2301 8654 1684 6873 6987 735." The direct mail that is generated and sent according to this approach may then invite each recipient of the direct mail to use his or her assigned invitation code to engage with the organization regarding the subject matter of the direct mail. For example, if the direct mail is directed to potential customers of a service offered by a financial services company, such as a credit card offer, the direct mail may invite each recipient to use his or her assigned invitation code (which is identified in the printed direct mail) to submit an application for the service (e.g., an application to open a credit card account with the financial services company based on the offer included in the direct mail) either over the phone or via the financial services company's website.

FIG. 1 shows one possible example configuration 100 of a direct mail system 101 that utilizes such an approach for engaging with individuals via direct mail. As shown in FIG.

1, the example direct mail system 101 may include a code mapping subsystem 103, a mail generation subsystem 104, an offer processing subsystem 105, and one or more data stores 110. However, it should be understood that the example direct mail system 101 may include various other subsystems as well.

The code mapping subsystem 103 may function to generate numeric/alphanumeric invitation codes and then assign those numeric/alphanumeric invitation codes to intended recipients of direct mail. To facilitate this functionality of assigning the invitation codes to intended recipients of direct mail, the code mapping subsystem 103 may have access to information about the intended recipients to whom the direct mail including the numeric/alphanumeric invitation codes is to be sent. Such information may include profile information for the intended recipients, such as name and residence information, and perhaps also offer information for the intended recipients, such as information about a particular offer to be extended to each intended recipient, among other possibilities. The profile and/or offer information for the intended recipients may be stored in the one or more data stores 110, in which case the code mapping subsystem 103 may access the profile and/or offer information from the one or more data stores 110, or the profile and/or offer information may be obtained from some other subsystem of the direct mail system 101 (or from some other external system), among other possibilities. After generating the numeric/alphanumeric invitation codes and assigning them to intended recipients, the code mapping subsystem 103 may provide information about the intended recipients of the direct mail and the numeric/alphanumeric invitation codes assigned to such recipients to the mail generation subsystem 104. For example, the code mapping subsystem 103 may provide such information to the mail generation subsystem 104 by transmitting the information to the mail generation subsystem 104 via a data communication and/or by storing the information in a shared data store 110 that is accessible by the mail generation subsystem 104 and thereby enabling the mail generation subsystem 104 to retrieve the information from the shared data store 110, among other possibilities.

The mail generation subsystem 104 may function to receive the information about the intended recipients of the direct mail and the numeric/alphanumeric invitation codes assigned to such recipients from the code mapping subsystem 103 (e.g., either via a data communication from the code mapping subsystem 103 or via retrieval from a data store 110 that is shared with the code mapping subsystem 103) and then use that received information to generate direct mail for each of the intended recipients that includes informational content about an offer being extended to the intended recipient along with the intended recipient's assigned numeric/alphanumeric invitation code, after which time such direct mail may be printed and sent out to the intended recipients.

After the direct mail is printed and sent out to the intended recipients, certain of those recipients may then use their assigned numeric/alphanumeric invitation codes to pursue the offer described in the direct mail. To do so, some of the recipients may contact the organization by phone and relay the numeric/alphanumeric invitation code over the phone, while other recipients may utilize client devices, such as example client devices 106, to access the direct mail system 101 over a data network 107 (e.g., via a web application or a mobile application running on the client devices) and input their assigned numeric/alphanumeric invitation codes to pursue the offer. In turn, the offer processing subsystem 105 may function to process the input from recipients who pursue the offers described in their received direct mail in order to facilitate further interaction with the recipients. For example, if the direct mail describes an offer to apply for a credit card and the offer processing subsystem 105 receives a message from a client device 106 indicating that a given intended recipient's assigned numeric/alphanumeric invitation code has been utilized, the offer processing subsystem 105 may cause the client device 106 to present the given intended recipient with a pre-populated application form for the credit card, and may thereafter function to facilitate the submission and/or processing of the application. Depending on the nature of the offer, the offer processing subsystem 105 may carry out other functions other as well.

In line with the discussion above, the one or more data stores 110 of the direct mail system 101 may be configured to store various types of data related to the direct mail process, including but not limited to profile information for intended recipients, offer information for intended recipients, invitation code information, and corresponding assignment information indicating which invitation codes have been assigned to which intended recipients, as some examples.

It should be understood that, in practice, each of the subsystems described above may generally take the form of some set of computing resources (e.g., one or more processors, memory, etc.) that are provisioned with executable program instructions for carrying out the functions of the subsystem. In this respect, the set of computing resources utilized to implement each subsystem may be part of a single physical computing system, or may distributed across multiple physical computing systems that are networked together, among various other possibilities.

However, this approach of inviting recipients of direct mail to use long, random numeric/alphanumeric invitation codes to engage with the organization sending the direct mail unnecessarily limits the rate of engagement with the receipts, because such invitation codes are difficult for people to relay over the phone or input into a client device that is running a web or mobile application associated with the organization. As a result, people may choose not to pursue the offer set forth in the direct mail because of the perceived inconvenience (or sometimes referred to as "friction") associated with using his or her assigned invitation code to pursue that offer further.

On the other hand, generating and managing other types of invitation codes (or the like) can present various technical challenges. For example, while it may be desirable to generate and use invitation codes that are easier for direct mail recipients to relay over the phone or type into the recipients' client devices, it is difficult to balance this desire against the need to assign each intended recipient a unique invitation code that will not conflict with other intended recipients, particularly when dealing with a direct mail campaign involving a large number of intended recipients. Indeed, when using a 23-digit numeric invitation code, this provides a nearly infinite number of different invitation code options (specifically, 1e+23 different options), which obviates the need for the direct mail system to re-use the same invitation code more than once and thereby simplifies the process for managing the invitation codes that have been assigned. In contrast, using invitation codes that are more "recipient friendly" substantially reduces the universe of invitation code options and likely gives rise to a need to re-use the same invitation codes for multiple different users over the course of time, which complicates the process for managing the invitation codes that have been assigned. For instance, when using invitation codes that have the potential to be re-used for multiple different recipients, a direct mail system needs to ensure that a given invitation code is only actively assigned to one recipient at any given time; otherwise, conflicts could arise between different intended recipients that could interfere with a recipient's ability to pursue a direct mail offer, cause recipient confusion or frustration, and/or perhaps even raise privacy concerns. Other challenges also exist.

To address these and other problems, disclosed herein is new technology for improving the process of engaging with individuals via direct mail. As described below, the disclosed technology involves a new software-based process for generating recipient-friendly, word-based passphrases and then utilizing those passphrases to generate direct mail for intended recipients, which may then be printed and sent out to the intended recipients in order to facilitate targeted interactions between the intended recipients and an organization seeking to engage with them. In a preferred embodiment, that word-based passphrases that are generated in accordance with the present disclosure may comprise four-word passphrases, but other embodiments are possible as well, including one embodiment in which the disclosed technology is utilized to generate three-word passphrases and another embodiment in which the disclosed technology is utilized to generate passphrases having five (or more) words.

Figure 2:
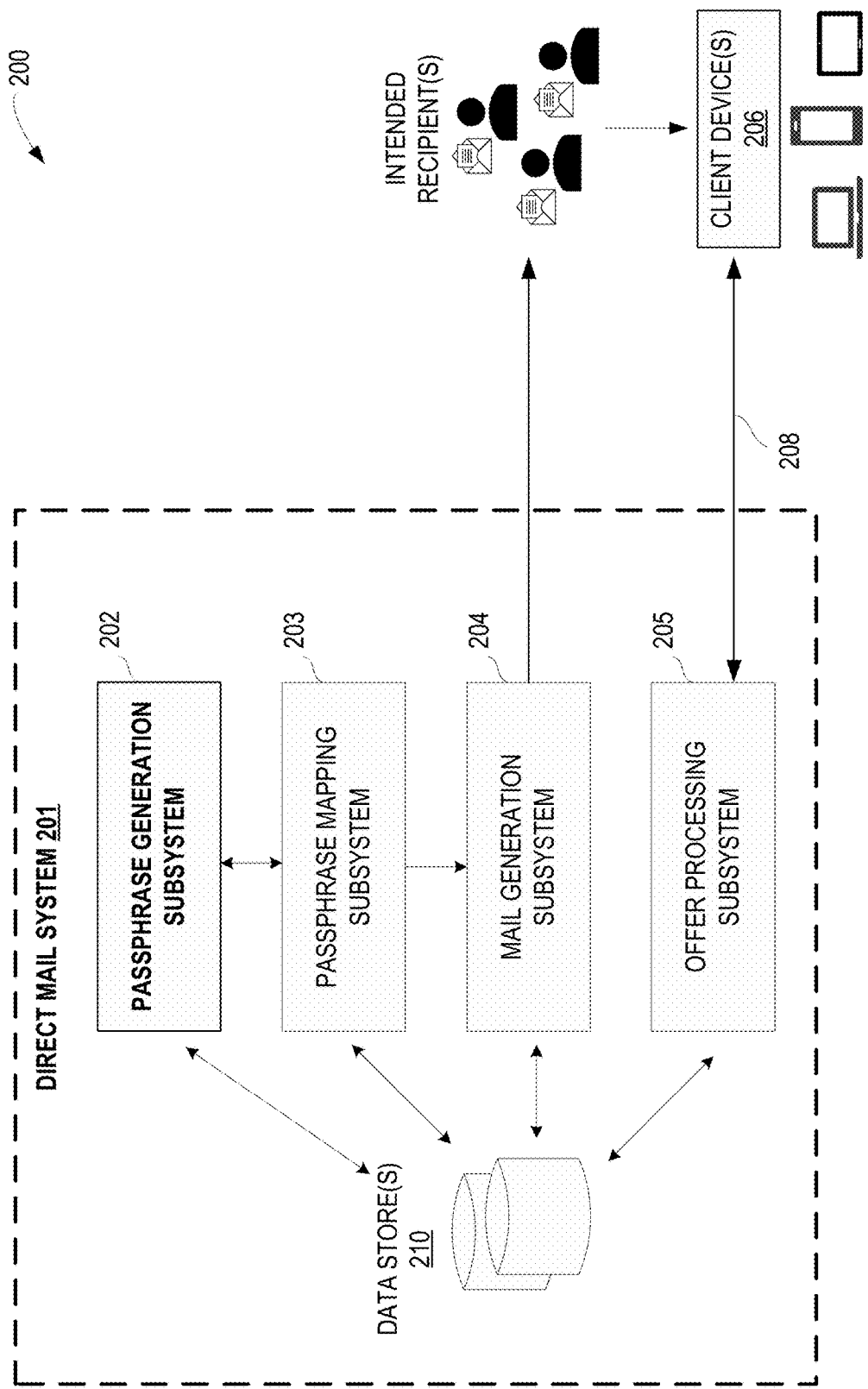
FIG. 2 depicts an example system configuration including an example direct mail system that is configured to include a new passphrase generation subsystem in accordance with the disclosed technology.

FIG. 2 shows one possible example configuration 200 of a direct mail system 201 that incorporates the new technology disclosed herein for engaging with individuals via direct mail. As shown in FIG. 2, the example direct mail system 201 may include a passphrase generation subsystem 202, a passphrase mapping subsystem 203, a mail generation subsystem 204, an offer processing subsystem 205, and one or more data stores 210. However, it should be understood that the example direct mail system 201 may include various other subsystems as well.

At a high level, the passphrase generation subsystem 202 may function to (i) generate a pool of available words that can be used for generating passphrases, (ii) based on the pool of available words, generate new batches of passphrases for use on direct mail that is to be sent to intended recipients, (iii) provide the new batches of passphrases to the passphrase mapping subsystem 203 in order to release the passphrases for use on direct mail, such as by transmitting the new batches of passphrases to the passphrase mapping subsystem 203 via a data communication and/or storing the new batches of passphrases in a shared data store 210 that is accessible by the passphrase mapping subsystem 203 and thereby enabling the passphrase mapping subsystem 203 to retrieve the information from the shared data store 210, among other possibilities, and (iv) track and manage status information for the passphrases that have been generated. This functionality of the passphrase generation subsystem 202 will be described in further detail below.

The passphrase mapping subsystem 203 may function to receive passphrases that have been generated by the passphrase generation subsystem 202 (e.g., either via a data communication from the passphrase generation subsystem 202 or via retrieval from a shared data store 210) and then assign such passphrase to intended recipients of direct mail. The passphrase mapping subsystem 203 may carry out this function in various manners.

In one implementation, the passphrase mapping subsystem 203 may first generate numeric/alphanumeric invitation codes and assign those numeric/alphanumeric invitation codes to intended recipients of direct mail, similar to how the code mapping subsystem 103 of direct mail system 101 functions. In this respect, the passphrase mapping subsystem 203 may similarly have access to information about the intended recipients to whom direct mail is to be sent, such as profile information (e.g., name and residence information), which the passphrase mapping subsystem 203 may use to assign the generated numeric/alphanumeric invitation codes to intended recipients. For example, the information about the intended recipients may be stored in one or more data stores 210 of the direct mail system 201, in which case the passphrase mapping subsystem 203 may access the information about the intended recipients from the one or more data stores 210, or the information about the intended recipients may be obtained from some other subsystem of the direct mail system 201 (or from some other external system), among other possibilities. However, unlike the code mapping subsystem 103 described above, the passphrase mapping subsystem 203 may then perform the additional function of mapping passphrases that have been generated by the passphrase generation subsystem 202 to the previously generated and assigned numeric/alphanumeric invitation codes, which thereby serves to assign the passphrases to the intended recipients. For instance, the passphrase mapping subsystem 203 may (i) access a set of passphrases that have previously been generated by the passphrase generation subsystem 202 and received by the passphrase mapping subsystem 203 in some way, and then (ii) map each respective passphrase in the accessed set to a respective numeric/alphanumeric invitation code that has been assigned to a respective intended recipient and thereby associate the respective passphrase with the respective intended recipient.

In another implementation, the passphrase mapping subsystem 203 may assign the passphrases that have been generated by the passphrase generation subsystem 202 to intended recipients without previously generating or using any numeric/alphanumeric invitation codes. For instance, the passphrase mapping subsystem 203 may (i) access a set of passphrases that have previously been generated by the passphrase generation subsystem 202 and received by the passphrase mapping subsystem 203 in some way, (ii) identify a set of intended recipients to which passphrases are to be assigned (e.g., based on profile data that is accessible to the passphrase mapping subsystem 203), and then (iii) assign each respective passphrase in the accessed set to a respective one of the intended recipients in the identified set.

It should be understood that the passphrase mapping subsystem 203 may assign the passphrases generated by the passphrase generation subsystem 202 to intended recipients of direct mail in other manners as well.

After assigning the generated passphrases to the intended recipients, the passphrase mapping subsystem 203 may provide information about the intended recipients of the direct mail along with the generated passphrases (and perhaps also the numeric/alphanumeric invitation codes) assigned to such recipients to the mail generation subsystem 204. The passphrase mapping subsystem 203 may provide such information in various ways, such as by transmitting the information to the mail generation subsystem 204 via a data communication and/or storing the information in a shared data store 210 that is accessible by the mail generation subsystem 204 and thereby enabling the mail generation subsystem 204 to retrieve the information from the shared data store 210.

The mail generation subsystem 204 may function to (i) receive the information about the intended recipients of the direct mail along with the generated passphrases (and perhaps also the numeric/alphanumeric invitation codes) assigned to such recipients from the passphrase mapping subsystem 203 (e.g., either via a data communication from the passphrase mapping subsystem 203 or via retrieval from a data store 210 that is shared with the passphrase mapping subsystem 203) and then (ii) use that information to generate direct mail for each of the intended recipients that includes informational content about an offer being extended to the intended recipient along with the intended recipient's assigned passphrase (and perhaps also the assigned invitation code), after which time such direct mail may be printed and sent out to the intended recipients.

After the direct mail is printed and sent out to the intended recipients, certain of those recipients may then use their assigned passphrases to pursue the offer set forth in the direct mail. To do so, some of the recipients may contact the organization by phone and relay the passphrases over the phone, while other recipients may utilize client devices, such as example client devices 206, to access the direct mailing system 201 over a data network 207 (e.g., via a web application or a mobile application running on the client device) and input their assigned passphrases to pursue the offer.

In turn, the offer processing subsystem 205 may function to process the input from recipients who pursue the offers described in their received direct mail using their assigned passphrases in order to facilitate further interaction with the recipients. For example, if the direct mail describes an offer to apply for a credit card and the offer processing subsystem 205 receives a message from a given client device 206 indicating that a given intended recipient's assigned passphrase has been utilized, the offer processing subsystem 205 may cause the given client device 206 to present the given intended recipient with a pre-populated application form for the credit card, and may thereafter function to facilitate the submission and/or processing of the application. To facilitate this functionality, the offer processing subsystem 205 may use the passphrase that is included in the message received from the client device 206 to identify the intended recipient to whom the passphrase is assigned and obtain profile and/or offer information about the intended recipient, which may involve accessing such information from a data store 210 that is accessible to the offer processing subsystem 205 and/or requesting and receiving such information from another subsystem of the direct mail system (e.g., passphrase mapping subsystem 203), among other possibilities. Depending on the nature of the offer, the offer processing subsystem 205 may carry out other functions other as well.

In line with the discussion above, and as described in further detail below, the one or more data stores 210 of the direct mail system 201 may be configured to store various types of data related to the new direct mail process disclosed herein, including but not limited to profile information for intended recipients, offer information for intended recipients, passphrases, status information for the passphrases (e.g., information about whether or not passphrases have been released for use on direct mail), timing information for the passphrases (e.g., when passphrases were generated, when passphrases were released for use on direct mail, how long and/or until when passphrases will remain valid for use on direct mail, when passphrases will expire, etc.), and assignment information for the passphrases indicating which passphrases have been assigned to which intended recipients, as some examples.

It should be understood that, in practice, each of the subsystems described above may generally take the form of some set of computing resources (e.g., one or more processors, memory, etc.) that are provisioned with executable program instructions for carrying out the functions of the subsystem. In this respect, the set of computing resources utilized to implement each subsystem of the example direct mail system 201 may be part of a single computing platform (e.g., a single organization's data platform), or may be distributed across multiple different computing platforms that are networked together (e.g., computing platforms of multiple organizations that are working together to provide direct mail), among various other possibilities.

For instance, according to one possible implementation of the direct mail system 201, the passphrase generation subsystem 202, the passphrase mapping subsystem 203, the mail generation subsystem 204, and the offer processing subsystem 205 may all be hosted by a single organization's computing platform, in which case the subsystems may interact with one another via intra-platform communications.

According to another possible implementation of the direct mail system 201, the passphrase generation subsystem 202, the passphrase mapping subsystem 203, the mail generation subsystem 204, and the offer processing subsystem 205 may be distributed between two or more organizations' computing platforms, in which case some of the subsystems may interact with one another via intra-platform communications while others of the subsystems may interact with one another via inter-platform communications that may be carried over a Wide-Area Network (WAN) or the like. For instance, the passphrase generation subsystem 202 and the passphrase mapping subsystem 203 could be distributed across two different computing platforms, in which case the passphrase generation subsystem 202 may provide the passwords to the passphrase mapping subsystem 203 via inter-platform data communication that may be carried over a WAN or the like. In turn, the mail generation subsystem 204 and the offer processing subsystem 205 may each by hosted on one of these two computing platforms, or may each be hosted on a different computing platform.

Further, in such an implementation, the one or more data stores 210 of the direct mail system 201 may likewise be distributed between the two or more organizations' computing platforms. For example, the first computing platform hosting the passphrase generation subsystem 202 may comprise a first set of one or more data stores 210 that are configured to store data that is written and/or read by the passphrase generation subsystem 202, such as the generated passphrases and corresponding status information, and the second computing system hosting the passphrase mapping subsystem 203 may comprise a second set of one or more data stores 210 that are configured to store data that is written and/or read by the passphrase mapping subsystem 203, such as the profile and/or offer information for the intended recipients and the passphrases that have been released for use on direct mail along with corresponding assignment information, and so on. However, it is possible that the two separate computing platforms may also have the capability to write to and/or read from one or more shared data stores that are accessible by both of the computing platforms.

Various other implementations of the functional subsystems of the direct mail system 201 are possible as well.

Advantageously, the disclosed technology for engaging with individuals via direct mail enhances the recipient experience by making the process of pursuing direct mail offers more intuitive and less prone to difficulty and/or recipient error when attempting to pursue the direct mail offers, thus increasing the rate of engagement resulting from direct mail offers. Additionally, as described in further detail below, the new software-based process for generating the passphrases that is disclosed herein enables quicker and more efficient generation of passphrases for direct mail and also enables intelligent tracking of the status of such passphrases (e.g., whether or not given passphrases have been released for use, whether or not given passphrases have been assigned to intended recipients, when given passphrases are set to expire, etc.).

Figure 3:
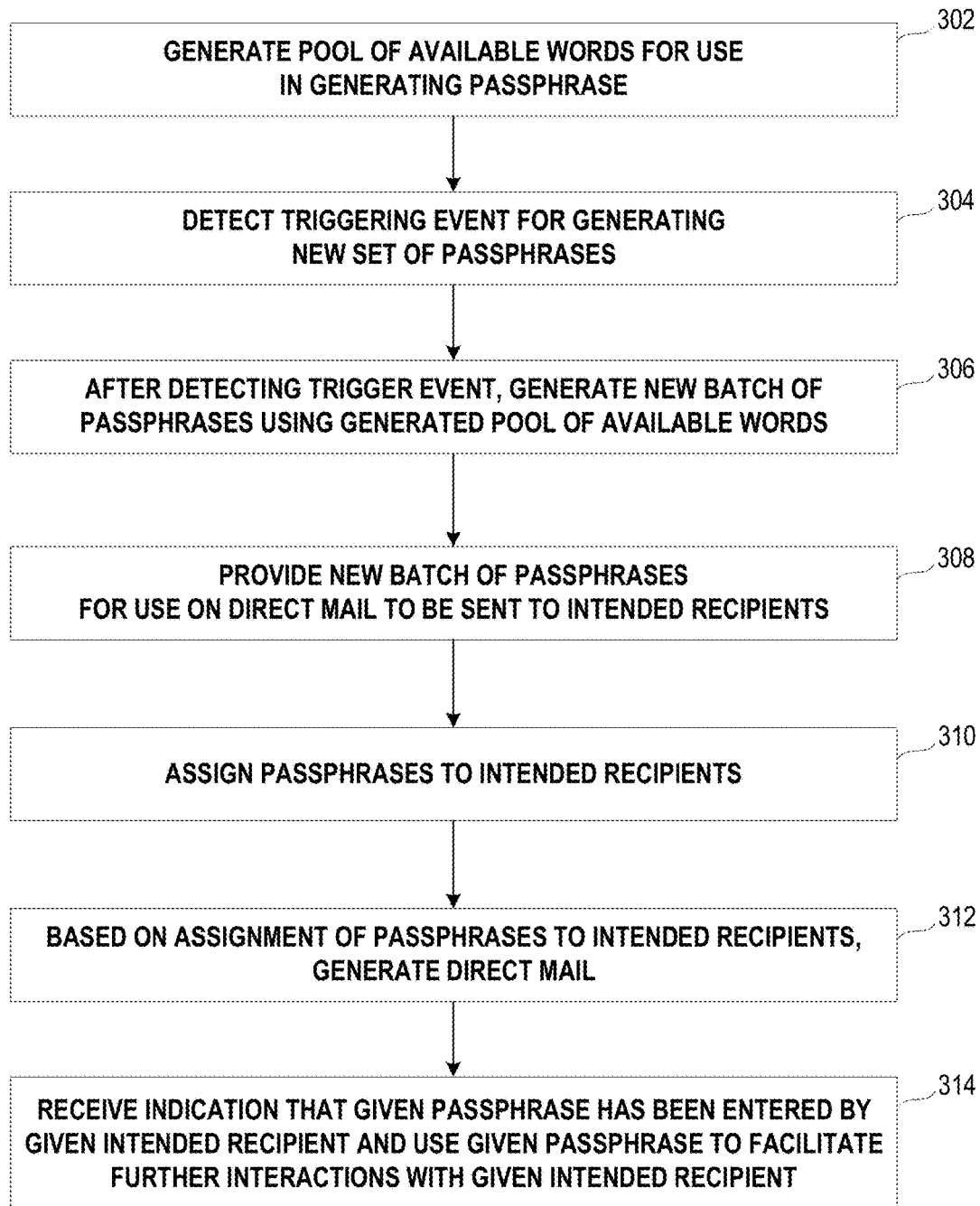
FIG. 3 depicts a flow diagram of an example high-level process for facilitating engagement with intended recipients via the direct mail system of FIG. 2.

Turning now to FIG. 3, a flow diagram of an example process 300 for generating and implementing passphrases in a direct mail system in accordance with the software technology disclosed herein is depicted. For purposes of illustration, the example process of FIG. 3 is described as being carried out by the subsystems 202-205 of the example direct mail system 201 shown in FIG. 2, but it should be understood that the example process of FIG. 3 may be carried out by any one or more computing systems, including those not shown in FIG. 2. Further, while the example process 300 is described with reference to an embodiment where the generated passphrases take the form of four-word passphrases, it should be understood that the example process 300 can be utilized to generate and use passphrases having less than or more than four words. Further yet, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment without deviating from the disclosure herein.

Figure 4:
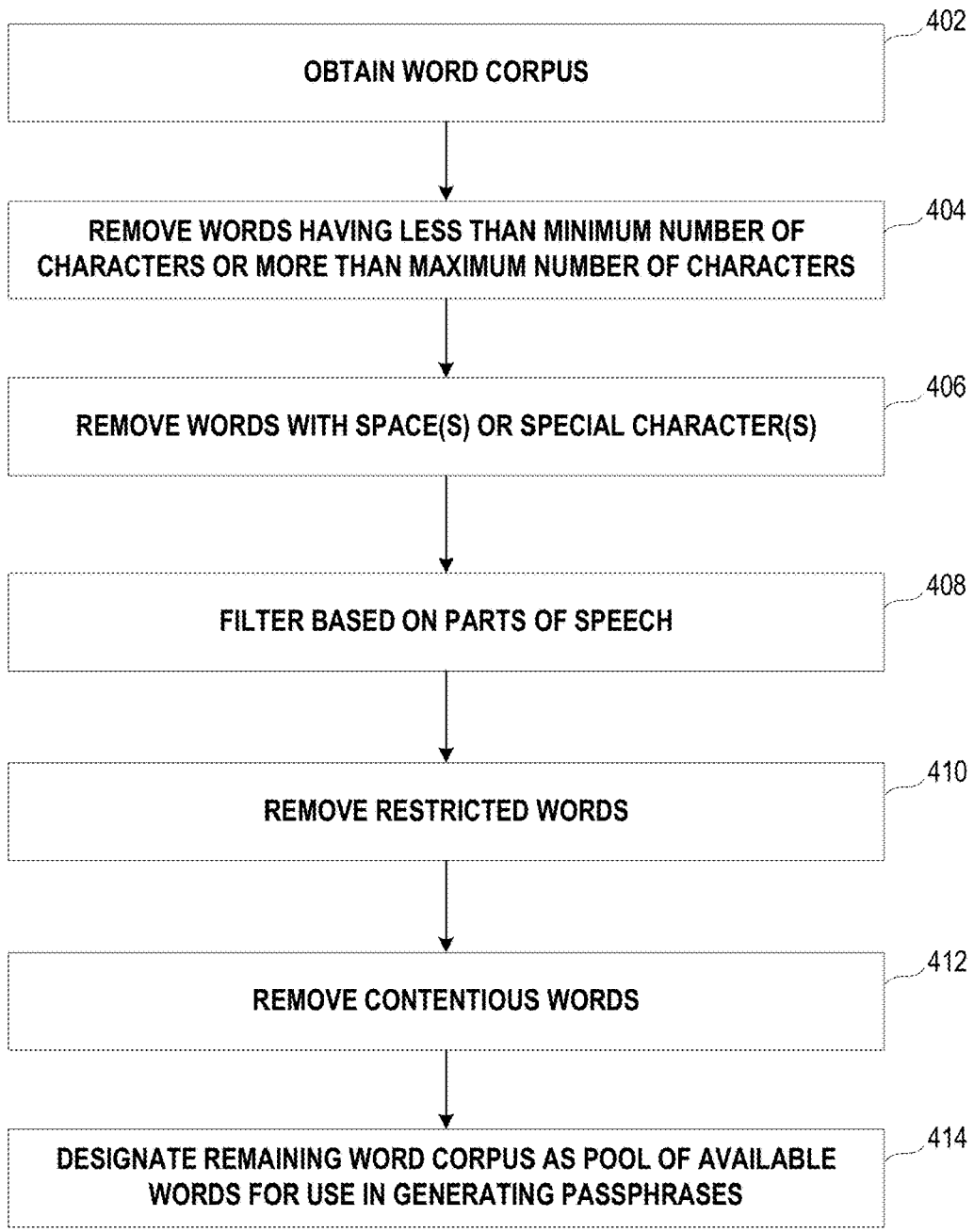
FIG. 4 depicts a flow diagram of an example process for generating a pool of available words that is to be used for generating passphrases in accordance with the disclosed technology.

As shown in FIG. 3, the example process 300 may begin at block 302 with the direct mail system generating a pool of available words that are to be used for generating four-word passphrases. This pool of available words for use in generating four-word passphrases may be generated in various manners. One example of a process 400 for generating a pool of available words for use in generating four-word passphrases in accordance with the present disclosure is shown in FIG. 4. For purposes of illustration, the example process 400 is described as being carried out by the passphrase generation subsystem 202 of the example direct mail system 201 shown in FIG. 2, but it should be understood that the example process of FIG. 4 may be carried out by any one or more computing systems that are installed with the software technology disclosed herein.

As shown in FIG. 4, the example process 400 may begin at block 402 with the passphrase generation subsystem 202 obtaining a word corpus, which may generally comprise some collection of words from a given language. The word corpus may be obtained in various ways. As one possibility, the passphrase generation subsystem 202 may obtain the word corpus from a lexical database, such as WordNet® provided by Princeton University, but the word corpus may be obtained in various other manners as well. Further, the word corpus may take any of various forms, and in a preferred implementation, the obtained word corpus may comprise a collection of words that is large enough such that it can be culled based on one or more filters and still provide an ample number of words for use in generating unique four-word passphrases for intended recipients of direct mail. In this regard, as one possible example, the obtained word corpus may comprise thousands of words (e.g., 4,000 to 6,000 words) that can be used to generate millions of unique four-word passphrases.

After obtaining the word corpus, the passphrase generation subsystem 202 may then apply various pre-processing operations on in order to pare down the word corpus to a pool of available words for use generating the four-word passphrases. These pre-processing operations may take various forms.

As one possibility, the passphrase generation subsystem 202 may apply a pre-processing operation that functions to filter the word corpus based on a minimum and/or maximum character requirement. For instance, as shown at block 404, the passphrase generation subsystem 202 may remove any words from the word corpus that have (i) less than a minimum number of characters or (ii) more than a maximum number of characters. In one example, the minimum number of characters may be four and the maximum number of characters may be eight, but other examples are possible as well. Further, in practice, the minimum and/or maximum character requirements may be defined based on user input, or may be predefined in the executable program instructions installed at the passphrase generation subsystem 202, among other possibilities.

As another possibility, the passphrase generation subsystem 202 may filter the word corpus in order to remove words with spaces and/or certain special characters. For instance, as shown at block 406, the passphrase generation subsystem 202 may filter the word corpus to remove any words that either (i) contain at least one space, (ii) contain at least one instance of a special character that has been designated for removal, which may include any of ! @ #$ % & * ? — (among other examples), or (iii) contain a combination thereof. Further, in practice, the set of special characters may be defined based on user input, or may be predefined in the executable program instructions installed at the passphrase generation subsystem 202, among other possibilities.

As yet another possibility, the passphrase generation subsystem 202 may apply a pre-processing operation that functions to filter the word corpus based on various grammatical aspects, such as parts of speech or types of words, in order to remove certain words that may not be suitable for inclusion in a passphrase for direct mail. For instance, as one possible example, as shown at block 408, the passphrase generation subsystem 202 may filter the word corpus based on one or more parts of speech. For example, the passphrase generation subsystem 202 may remove words belonging to certain parts of speech other than nouns—which tend to be less "contentious"—such as by filtering out adverbs and/or adjectives. Other examples are also possible. Further, in practice, the parts of speech to remove may be defined based on user input, or may be predefined in the executable program instructions installed at the passphrase generation subsystem 202, among other possibilities. As another possible example, the passphrase generation subsystem 202 may apply a pre-processing operation that functions to filter the word corpus based on one or more types of words. For instance, the passphrase generation subsystem 202 may filter the word corpus to remove homophones, which are words that may sound phonetically similar to one or more other words but are spelled differently and have a different meaning (e.g., "their" and "there," "bowled" and "bold," "site," "sight," and "cite," etc.), to reduce the possibility of error or confusion (e.g., at the time of redeeming a direct mail offer) that may be caused by two or more homophones being included in a single passphrase. In practice, such words may be defined based on user input, or may be predefined in the executable program instructions installed at the passphrase generation subsystem 202, among other possibilities. Other examples are also possible.

As still another possibility, the passphrase generation subsystem 202 may apply a pre-processing operation that functions to filter the word corpus by removing certain pre-identified words. For instance, as shown at block 410, the passphrase generation subsystem 202 may filter the word corpus to remove certain words belonging to a given set of "restricted words." These restricted words may take various forms, including but not limited to words that are deemed to be inappropriate, such as profanity, and/or words that are informal and/or unprofessional, such as slang words. Other examples are also possible. Further, in practice, the given set of restricted words for removal may be defined based on user input, or may be predefined in the executable program instructions c, among other possibilities.

As a further possibility, the passphrase generation subsystem 202 may apply a pre-processing operation that functions to filter the word corpus based on the semantic meaning of words. For instance, as shown at block 412, the passphrase generation subsystem 202 may filter the word corpus to remove certain words that are considered to be "contentious." These contentious words may take various forms, including but not limited to words that convey a negative sentiment and/or are associated with a negative connotation. The passphrase generation subsystem 202 may identify contentious words for removal in various ways. As one example, the passphrase generation subsystem 202 may utilize one or more sentiment analyzer engines (e.g., Python's Natural Language Toolkit (NLTK), Stanford University's natural language processor CoreNLP, etc.) to identify words that convey a negative sentiment and/or are associated with a negative connotation, and may then remove any such words. Other examples are also possible.

The passphrase generation subsystem 202 may be configured to apply other pre-processing operations to the word corpus as well.

In practice, the pre-processing operations described above could either be carried out in sequence, in parallel, or some combination thereof. For instance, in one possible implementation, the passphrase generation subsystem 202 may be configured to carry out the pre-processing operations of blocks 404-412 in a particular sequential order, such as the order in which these pre-processing operations are shown in FIG. 4. However, it should be understood that these pre-processing operations may also be carried out in any of various other sequential orders, and/or that some of all of the pre-processing operations may be carried out in parallel with one another (e.g., via multi-threaded processing).

Regardless of the particular implementation, after the pre-processing operations of blocks 404-412 have been carried out, the remaining words in the word corpus may comprise words that (i) contain a certain range of characters (e.g., between four to eight characters), (ii) do not contain any spaces or special characters designated for removal, (iii) belong to certain parts of speech, (iv) are not restricted, and (v) are not deemed to be contentious.

Thereafter, at block 414, the passphrase generation subsystem 202 may designate the remaining words in the pre-processed word corpus as the pool of available words for use in generating four-word passphrases, and this pool of available words may then be stored in the one or more data stores 210 of the direct mail system 201 (e.g., a data store 210 that is accessible by the passphrase generation subsystem 202), for later use in generating four-word passphrases.

Returning to FIG. 3, at block 304, the passphrase generation subsystem 202 may detect a trigger event for generating a new batch of four-word passphrases. The trigger event may take various forms.

As one possibility, the trigger event may comprise a determination that a milestone has been reached on a pre-determined schedule that dictates when new batches of four-word passphrases are to be generated (e.g., a schedule dictating that a new batch of four-word passphrases is to be generated once per week, once per month, etc.). For example, if the passphrase generation subsystem 202 is configured in accordance with a pre-determined schedule dictating that a new batch of passphrases is to be generated once per week at a particular time, then the function of detecting a trigger event for generating a new batch of four-word passphrases may involve determining that the particular time to generate the new batch of passphrases has arrived.

As another possibility, the trigger event may comprise receipt of a request to generate a new batch of four-word passphrases from either another subsystem of the direct mail system 201 (e.g., the passphrase mapping subsystem 203) or a client device associated with an individual involved in the direct mail process, among other possibilities.

As yet another possibility, the trigger event may comprise a determination that there is less than a threshold number of generated four-word passphrases that are available to release for use on direct mail. For example, each time that the passphrase generation subsystem 202 releases a batch of passphrases for use on direct mail, the passphrase generation subsystem 202 may be configured to evaluate the remaining number of generated but yet-to-be-released passphrases, and if that number is below a threshold, then this may serve as a trigger event for generating a new batch of passphrases. Alternatively, the passphrase generation subsystem 202 may be configured to assume that each time some set of passphrases is released for use on direct mail, a new batch of passphrases should be generated, and this may serve as a trigger event for generating a new batch of passphrases.

The trigger event may take other forms as well. Further, in some instances, the trigger event may indicate a quantity of passphrases that are to be included in the new batch of four-word passphrases to be generated, while in other instances, the quantity of passphrases that are to be included in each new batch of four-word passphrases to be generated may be defined in advance based on user input or may be predefined in the executable program instructions installed at the passphrase generation subsystem 202, among other possibilities.

Figure 5:
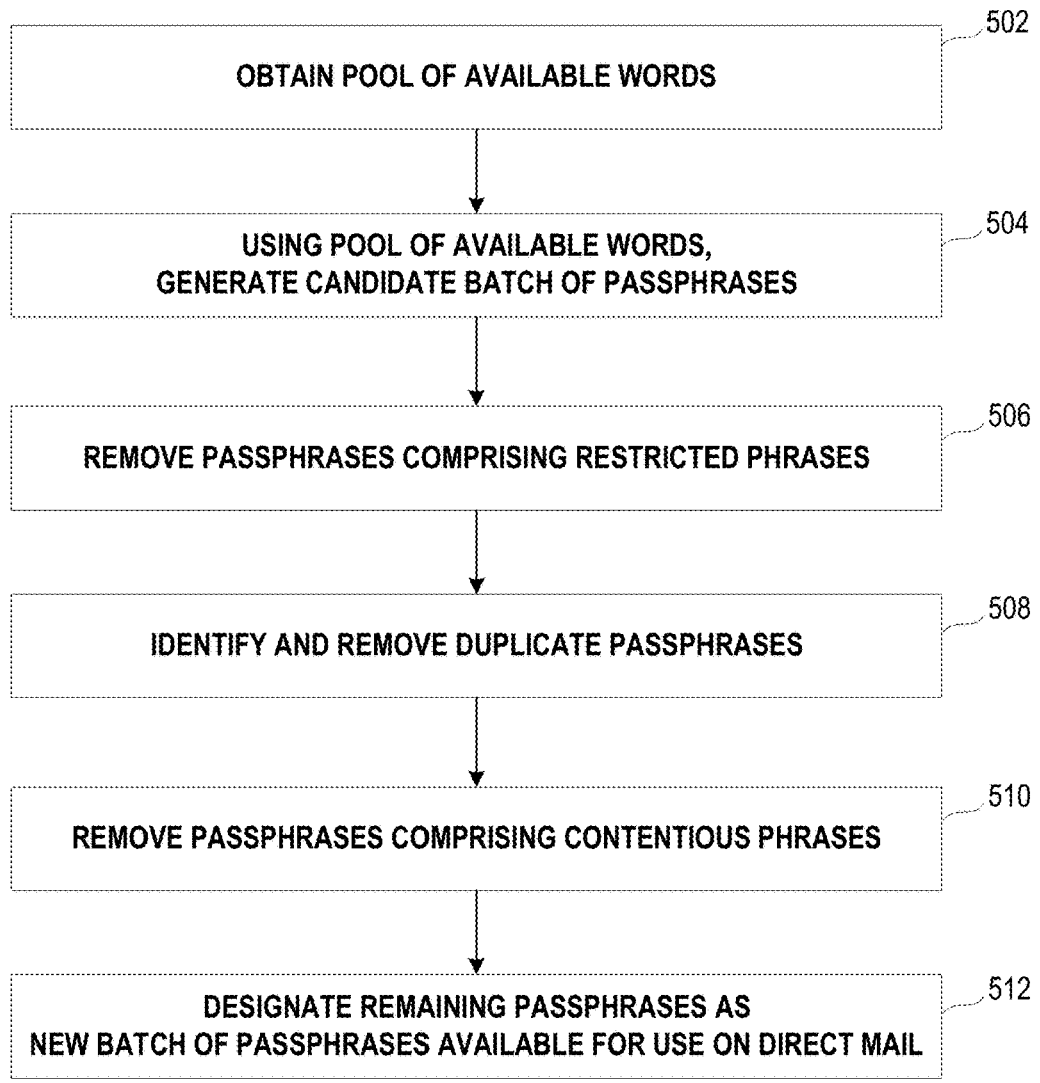
FIG. 5 depicts a flow diagram of an example process for generating passphrases in accordance with the disclosed technology.

At block 306, after detecting the trigger event, the passphrase generation subsystem 202 may proceed to generate a new batch of four-word passphrases using the pool of available words that was previously generated at block 302. This new batch of four-word passphrases may be generated in various manners. One example of a process 500 for generating a new batch of four-word passphrases using the pool of available words in accordance with the present disclosure is shown in FIG. 5. For purposes of illustration, the example process 500 is described as being carried out by the passphrase generation subsystem 202 of the example direct mail system 201 shown in FIG. 2, but it should be understood that the example process of FIG. 5 may be carried out by any one or more computing systems that are installed with the software technology disclosed herein, including any one or more other subsystems of the direct mail system 201.

As shown in FIG. 5, the example process 500 may begin at block 502 with the passphrase generation subsystem 202 fetching the pool of available words that was previously generated at block 302 of FIG. 3 (e.g., by accessing the pool of available words from the one or more data stores of the direct mail system 201).

At block 504, the passphrase generation subsystem 202 may then generate a candidate batch of four-word passphrases using the pool of available words. The passphrase generation subsystem 202 may generate the candidate batch of four-word passphrases in various ways. As one possibility, the passphrase generation subsystem 202 may apply a randomizer engine (or the like) or a randomized algorithm (such as a Java-based randomized selection algorithm, or the like) to the pool of available words in order to randomly select various different four-word sequences and thereby generate four-word passphrases that each have a randomly-selected sequence of four words from the available pool of words. The passphrase generation subsystem 202 may generate the candidate batch of four-word passphrases in other ways as well.

After generating the candidate batch of four-word passphrases, the passphrase generation subsystem 202 may apply various pre-processing operations in order to pare down the candidate batch of four-word passphrases to a new batch of four-word passphrases that will then be designated for release. These pre-processing operations may take various forms.

As one possibility, the passphrase generation subsystem 202 may apply a pre-processing operation that functions to filter the candidate batch of four-word passphrases by removing certain passphrases. For example, at block 506, the passphrase generation subsystem 202 may filter the candidate batch of four-word passphrases to remove any passphrases containing sequences of words that belong to a given set of "restricted phrases." These restricted phrases may take various forms, including but not limited to sequences of words that are deemed to be inappropriate when combined together, and/or sequences of words that are considered too informal and/or unprofessional when combined together, such as slang phrases. Other examples are also possible. Further, in practice, the given set of restricted phrases may be defined based on user input, or may be predefined in the program instructions, among other possibilities.

As another possibility, the passphrase generation subsystem 202 may apply a pre-processing operation that functions to filter the candidate batch of four-word passphrases by de-duplicating the candidate batch of four-word passphrases. For instance, at block 508, the passphrase generation subsystem 202 may analyze the candidate batch of four-word passphrases to identify "duplicate" passphrases and may then remove any such duplicate passphrases. In accordance with the present disclosure, a "duplicate" passphrase may refer to a passphrase that is either identical to another passphrase or is sufficiently similar to another passphrase to warrant removal, which may include (i) a passphrase that appears similar to another passphrase when the spaces between the two passphrases' four words are removed and/or (ii) a passphrase that contains a different sequential order of the same combination of four words as another passphrase. Further, when analyzing the candidate batch of four-word passphrases to identify any "duplicate" passphrases, the passphrase generation subsystem 202 may be configured to analyze the four-word passphrases in the candidate batch relative to one another and also relative to any other previously-generated passphrases that are currently "active," which may include (i) four-word passphrases that have previously been generated but have not yet been released by the passphrase generation subsystem 202 for use on direct mail (e.g., one or more other recently-generated batches of four-word passphrases), which may be referred to herein as "unreleased" four-word passphrases, and (ii) four-word passphrases that have been released by the passphrase generation subsystem 202 for use on direct mail and have not yet expired, which may be referred to herein as "released" four-word passphrases. These two categories of previously-generated passphrases may collectively be referred to herein as "active" four-word passphrases. In order to identify duplicate passphrases for removal, the passphrase generation subsystem 202 may employ duplicate checking logic that may take any of various forms.

As one possible example of duplicate checking logic that could be utilized, the passphrase generation subsystem 202 may begin by creating a first modified version of each four-word passphrase in the candidate batch that has the spaces between the passphrase's four words removed, which may be referred to herein as a "no-space version" of the four-word passphrase. In turn, the passphrase generation subsystem 202 may evaluate the no-space version of each four-word passphrase in the candidate batch against (i) the no-space versions of the other four-word passphrases in the candidate batch and (ii) no-space versions of any other active four-word passphrases, where such no-space versions may have previously been created and stored during a prior iteration of generating a batch of four-word passphrases. When performing this evaluation, the passphrase generation subsystem 202 may search for no-space versions that are direct matches to one another and perhaps also no-space versions that, while not directly matching, have a threshold level of similarity to one another (e.g., some threshold extent of overlap between the no-space versions of the passphrases). Either before or after generating the no-space versions, the passphrase generation subsystem 202 may also alphabetically sort the candidate batch of four-word passphrases relative to one another and/or relative to the active four-word passphrases, which may allow the no-space duplicates check to be carried out in a quicker and more efficient manner (e.g., by using a "primary key" constraint).

According to one possible implementation of this "no-space version" duplicate checking logic, the passphrase generation subsystem 202 may begin by creating no-space versions of the four-word passphrases in the candidate batch and then alphabetically sorting the no-space versions of the four-word passphrases in the candidate batch relative to one another, which produces an alphabetically-sorted index of the no-space versions of the four-word passphrases in the candidate batch.

Next, the passphrase generation subsystem 202 may compare the no-space versions of the four-word passphrases in the alphabetically-sorted index against one another in order to identify any duplicates within the candidate batch of passphrases and then remove those passphrases which are determined to be duplicates of other passphrases (which may also be referred to herein as "intra-batch" de-duplication). In this respect, because the no-space versions of the four-word passphrases have been arranged into an alphabetically-sorted index, the passphrase generation subsystem 202 can perform this functionality by simply checking each respective no-space version in the index against the next no-space version in the index and then making a determination of whether or not the respective no-space version is a duplicate based on this one comparison, which avoids the need to compare each respective no-space version against every other alphabetical-ordered version in the index and thereby improves the speed and efficiency of identifying duplicates amongst the passphrases in the candidate batch.

After completing the intra-batch de-duplication of the four-word passphrases in the candidate batch as described above, the passphrase generation subsystem 202 may then perform "inter-batch" de-duplication by comparing the no-space versions of the remaining four-word passphrases in the candidate batch against no-space versions of the active four-word passphrases (i.e., passphrases that were previously generated as a result of prior runs of the process for generating new batches of passphrases and either have not yet been released or have been released and are not yet expired). For instance, the passphrase generation subsystem 202 may obtain a listing of no-space versions of active four-word passphrases, which may be stored along with the active four-word passphrases in the one or more data stores 210 of the direct mail system 201 as a result of prior runs of the process for generating new batches of passphrases, and may then compare the no-space version of each remaining four-word passphrase in the candidate batch against the accessed listing of no-space versions of the active four-word passphrases in order to identify any duplicates in the candidate batch and then remove them.

As one possibility, this obtained listing of no-space versions of the active four-word passphrases may take the form of an alphabetically-sorted index or the like, and the comparisons of the no-space versions of the four-word passphrases in the candidate batch against the alphabetically-sorted index may be performed by (i) alphabetically sorting the no-space versions of the passphrases in the candidate batch, (ii) checking the alphabetically-sorted, no-space version of each respective passphrase in the candidate batch against the alphabetically-sorted index, and (iii) based on the comparison, making a determination of whether or not the respective passphrase is a duplicate. Advantageously, comparing the alphabetically-sorted, no-space version of each respective passphrase in the candidate batch against the alphabetically-sorted index in this way allows for each respective alphabetically-sorted, no-space passphrase in the candidate batch to be compared against a reduced subset of active passphrases in the index that are alphabetically similar to the respective passphrase rather than comparing the respective passphrase against every single active passphrase in the index, which may thereby improve the speed and efficiency of inter-batch de-duplication.

As another possibility, the accessed listing of no-space versions of the active four-word passphrases may take the form of an alphabetically-sorted index or the like, and the comparisons of the no-space versions of the four-word passphrases in the candidate batch against the alphabetically-sorted index may be performed by (i) checking the no-space version of each respective passphrase in the candidate batch against the alphabetically-sorted index, (ii) based on the comparison, making a determination of whether or not the respective passphrase is a duplicate of an active passphrase, and (iii) if the respective passphrase is a duplicate of an active passphrase, removing that passphrase from the candidate batch.

According to another possible implementation of the "no-space version" duplicate checking logic, the passphrase generation subsystem 202 may begin by creating a temporary "combination" index that includes both (i) no-space versions of the four-word passphrases in the candidate batch and (ii) no-space versions of active passphrases that were-generated during previous runs of the process for generating new batches of four-word passphrases. The passphrase generation subsystem 202 may then alphabetically sort the combination index and then compare the no-space versions of the passphrases within the combination index against each other to identify any duplicate passphrases, similar to the intra-batch de-duplication process described above. Any identified duplicate passphrases may then be removed from the candidate batch.

It should be understood that the functionality of comparing the no-space versions of the four-word passphrases in the candidate batch relative to one another and/or relative to the no-space versions of active four-word passphrases to complete intra-batch and inter-batch de-duplication may take other forms as well, including using any technique now known or later developed for searching within a sorted index.

To illustrate with one possible real-world example, consider an example that involves comparing no-space versions of example Passphrase 1 and Passphrase 2 shown below:

| PASSPHRASE 1 (as generated) | PASSPHRASE 1 (no-space version) |
|---|---|
| play fully ingot herstory | playfullyingotherstory |
| PASSPHRASE 2 (as generated) | PASSPHRASE 2 (no-space version) |
| playful lying other story | playfullyingotherstory |

As shown, Passphrase 1 and Passphrase 2 depicted above each comprise a different combination of four different words, but the passphrases' respective no-space versions are identical. As a result, applying the duplicate logic as described above—which compares the no-space versions of Passphrase 1 and Passphrase 2— would result in a determination that the passphrases are duplicative. Thus, one of the two passphrases would be removed from the candidate batch, thereby ensuring that the remaining passphrase comprises a unique no-space sequence of words.

As another possible example of duplicate checking logic that could be utilized, the passphrase generation subsystem 202 may create a second modified version of each four-word passphrase in the candidate batch that both has the spaces between the passphrase's four words removed and also has the passphrase's four words internally rearranged into alphabetical order, which may be referred to herein as an "alphabetical-ordered version" of the four-word passphrase. To illustrate using Passphrase 1 of the preceding example, if a given four-word passphrase in the candidate batch is "play fully ingot herstory," the alphabetical-ordered version of that passphrase would be "fullyherstoryingotplay." In turn, the passphrase generation subsystem 202 may evaluate the alphabetical-ordered version of each four-word passphrase in the candidate batch against (i) the alphabetical-ordered versions of the other four-word passphrases in the candidate batch (e.g., intra-batch de-duplication) and (ii) alphabetical-ordered versions of any active four-word passphrases, which may have previously been created and stored during a prior iteration of generating batches of four-word passphrases (e.g., inter-batch de-duplication). When performing this evaluation, the passphrase generation subsystem 202 may search for alphabetical-ordered versions that are direct matches to one another and perhaps also alphabetical-ordered versions that, while not directly matching, have a threshold level of similarity to one another (e.g., some threshold extent of overlap between the alphabetical-ordered versions of the passphrases, such as a 50% overlap, a 75% overlap, etc.). To facilitate this functionality, the passphrase generation subsystem 202 may also alphabetically sort the alphabetical-ordered versions of the candidate batch of four-word passphrases relative to one another and/or relative to the alphabetical-ordered versions of the active four-word passphrases before performing this evaluation.

Advantageously, this combined functionality of creating the alphabetical-ordered versions of the four-word passphrases and then placing the alphabetical-ordered versions of the four-word passphrases into an alphabetically-sorted list may allow the duplicate check for passphrases having the same combination of four words to be carried out in a quicker and more efficient manner (e.g., by using a "primary key" constraint), particularly in scenarios where there are a large number of passphrases being evaluated. For instance, it is possible that a direct mail campaign may require tens of thousands of new four-word passphrases or more to be generated on a regular basis, and this enhanced logic for evaluating whether passphrases have the same combination of four words can significantly reduce the time and compute resources required to complete that operation.

According to one possible implementation of this "alphabetical-ordered" duplicate checking logic, the passphrase generation subsystem 202 may begin by creating alphabetical-ordered versions of the four-word passphrases in the candidate batch and then alphabetically sorting the alphabetical-ordered versions of the four-word passphrases in the candidate batch relative to one another, which produces an alphabetically-sorted index of the alphabetical-ordered versions of the four-word passphrases in the candidate batch.

Next, the passphrase generation subsystem 202 may perform intra-batch de-duplication by comparing the alphabetical-ordered versions of the four-word passphrases in the alphabetically-sorted index against one another in order to identify any duplicates within the candidate batch of passphrases and remove them. In this respect, because the alphabetical-ordered versions of the four-word passphrases have been arranged into an alphabetically-sorted index, the passphrase generation subsystem 202 can perform this functionality by simply checking each respective alphabetical-ordered version in the index against the next-listed alphabetical-ordered version in the index and then making a determination of whether or not the respective alphabetical-ordered version is a duplicate based on that one comparison, which avoids the need to compare each respective alphabetical-ordered version against every other alphabetical-ordered version in the index and thereby improves the speed and efficiency of identifying duplicates amongst the passphrases in the candidate batch.

After completing the intra-batch de-duplication, the passphrase generation subsystem 202 may then perform inter-batch de-duplication by comparing the alphabetical-ordered versions of the remaining four-word passphrases in the candidate batch against alphabetical-ordered versions of the active four-word passphrases (i.e., previously-generated passphrases that either have not yet been released or have been released and are not yet expired). For instance, the passphrase generation subsystem 202 may obtain a listing of alphabetical-ordered versions of active four-word passphrases, which may be stored along with the active four-word passphrases in the one or more data stores 210 of the direct mail system 201 as a result of prior iterations of the process for generating new batches of passphrases, and may then compare the alphabetical-ordered version of each remaining four-word passphrase in the candidate batch against the accessed listing of alphabetical-ordered versions of active four-word passphrases in order to identify any duplicates in the candidate batch and then remove them.

As one possibility, this obtained listing of alphabetical-ordered versions of the active four-word passphrases may take the form of an alphabetically-sorted index or the like, and the comparisons of the alphabetical-ordered versions of the four-word passphrases in the candidate batch against the alphabetically-sorted index may be performed by (i) checking the alphabetical-ordered version of each respective passphrase in the candidate batch against the alphabetically-sorted index, (ii) based on the comparison, making a determination of whether or not the respective passphrase is a duplicate of an active passphrase, and (iii) if the respective passphrase is a duplicate of an active passphrase, removing that passphrase from the candidate batch.

According to another possible implementation of the "alphabetical-ordered" duplicate checking logic, the passphrase generation subsystem 202 may begin by creating a temporary "combination" alphabetically-sorted index that includes both (i) alphabetical-ordered versions of the four-word passphrases in the candidate batch and (ii) alphabetical-ordered versions of the active passphrases that were generated during previous runs of the process for generating new batches of four-word passphrases. The passphrase generation subsystem 202 may then compare the alphabetical-ordered versions of the passphrases within the combination index against each other to identify any duplicate passphrases, similar to the intra-batch de-duplication process previously described. Any identified duplicate passphrases may then be removed from the candidate batch.

Advantageously, applying the "alphabetical-ordered" duplicate checking logic as described above may result in identification of duplicate passphrases that may otherwise have been overlooked by other duplicate checking logic, including duplicate checking logic that uses as-generated versions of passphrases or even alphabetically-sorted versions of passphrases without spaces removed. To illustrate with one possible real-world example, consider the example below that involves example Passphrase 3 and example Passphrase 4 of an example candidate batch:

| PASSPHRASE 3 (as generated) | PASSPHRASE 3 (alphabetical-spaced) | PASSPHRASE 3 (alphabetical-ordered) |
|---|---|---|
| doormat apple ball thew | apple ball doormat thew | appleballdoormatthew |
| PASSPHRASE 4 (as generated) | PASSPHRASE 4 (alphabetical-spaced) | PASSPHRASE 4 (alphabetical-ordered) |
| door ball apple matthew | apple ball door matthew | appleballdoormatthew |

Applying duplicate checking logic that compares the "as generated" versions of Passphrase 3 and Passphrase 4—respectively "doormat apple ball thew" and "door ball apple matthew" as shown in the first column of the example above—would not result in Passphrase 3 and Passphrase 4 being identified as duplicative. Similarly, applying duplicate checking logic that compares "alphabetical-spaced" versions of Passphrase 3 and Passphrase 4 in which the words of the passphrases are alphabetically arranged but do not have spaces removed— respectively "apple ball doormat thew" and "apple ball door matthew" as shown in the second column of the example above—would not result in Passphrase 3 and Passphrase 4 being identified as duplicative. On the other hand, applying duplicate checking logic that compares the "alphabetical-ordered" versions of Passphrase 3 and Passphrase 4 in which the words of the passphrases are alphabetically arranged and have spaces removed—respectively "appleballdoormatthew" and "appleballdoormatthew" as shown in the third column of the example above—would result in Passphrase 3 and Passphrase 4 being identified as duplicative. Subsequently, one of Passphrase 3 or Passphrase 4 would be removed from the candidate batch.

It should be understood that the functionality of comparing the alphabetical-ordered versions of the four-word passphrases in the candidate batch relative to one another and/or relative to the alphabetical-ordered versions of active four-word passphrases may take other forms as well, including using any technique now known or later developed for searching within a sorted search index.

Figure 6A:
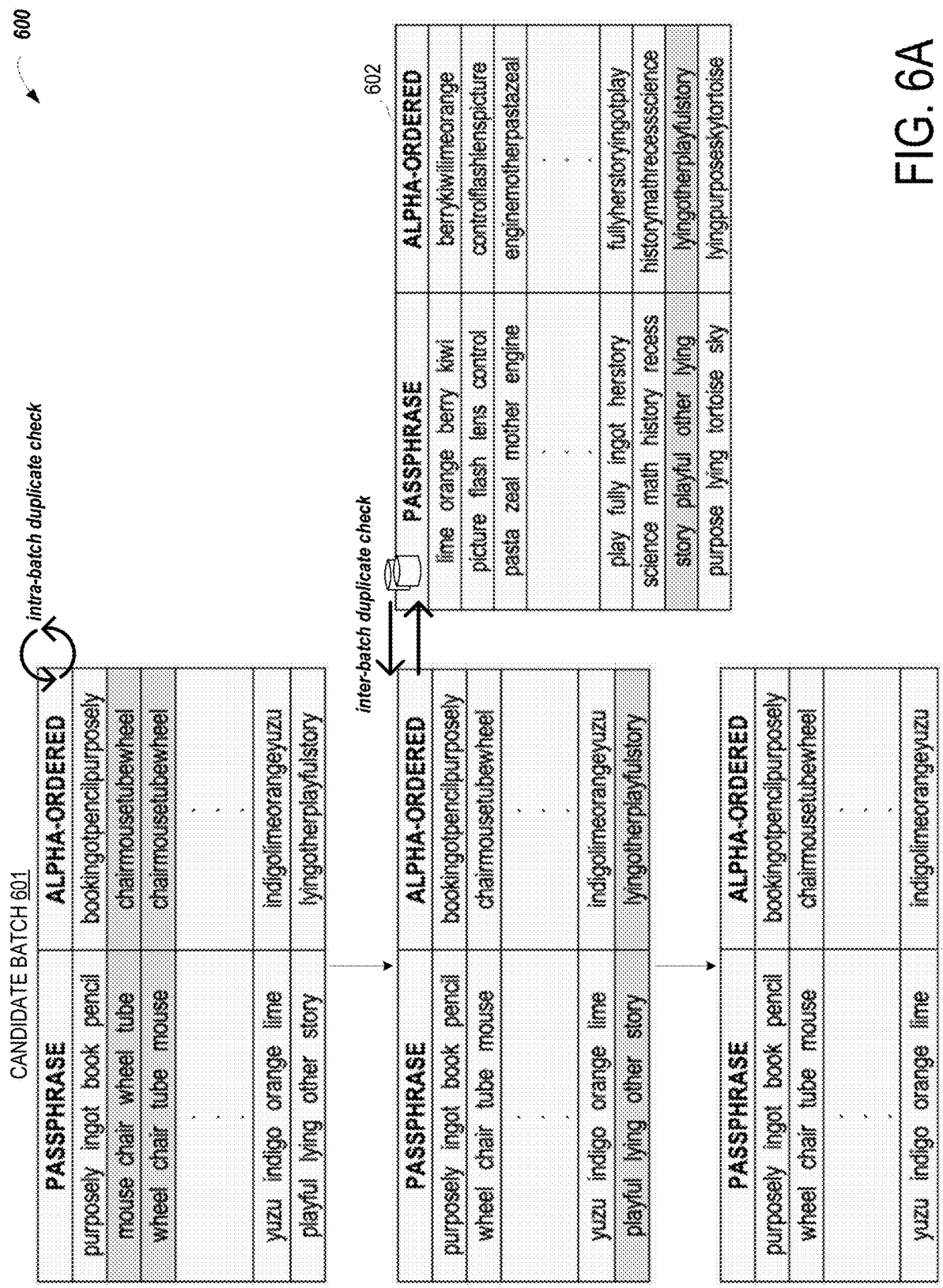
FIG. 6A depicts an example implementation of duplicate checking logic as applied to an example batch of passphrases in accordance with the disclosed technology.

To illustrate with a real-world example, consider FIG. 6A that depicts an example application 600 of the disclosed "alphabetical-ordered version" duplicate checking logic whereby alphabetical-ordered versions of four-word passphrases in a candidate batch are compared against each other and against alphabetical-ordered versions of active four-word passphrases. For the purposes of illustration, the duplicate checking logic that is applied in the example application 600 of FIG. 6A may be described as being carried out by the passphrase generation subsystem 202, but it should be understood that the act of carrying out the duplicate checking logic may be shared between the passphrase generation subsystem 202 and one or more other subsystems of the direct mail system 201 or may be performed entirely by one or more other subsystems of the direct mail system 201. The duplicate checking logic in the example application 600 may be applied to a candidate batch 601 of passphrases that have been generated by the passphrase generation subsystem 202 as a result of performing an iteration of the process for generating a new batch of passphrases described above with reference to block 504 of FIG. 5. The candidate batch 601 may include a number of passphrases, of which five illustrative passphrases are shown in FIG. 6A. In line with the discussion above, the passphrase generation subsystem 202 may begin the duplicate checking logic by obtaining an index comprising alphabetically-ordered (depicted in FIG. 6A as "Alpha-Ordered") versions of the passphrases in the candidate batch 601 in which (i) the spaces between the four words of the passphrase have been removed and (ii) the four words of the passphrase have been re-arranged into alphabetical order. Further, as shown in FIG. 6A, the passphrase generation subsystem 202 may have alphabetically sorted the passphrases in the candidate batch 601 by their alphabetical-ordered versions. It should be understood that the passphrases in the candidate batch 601 and their corresponding the "Alpha-Ordered" index are shown side-by-side in FIG. 6A for illustrative purposes and that in practice, the "Alpha-Ordered" index may be a stand-alone index.

Thereafter, the passphrase generation subsystem 202 may proceed to de-duplicate the candidate batch 601 by applying the disclosed "alphabetical-ordered" duplicate checking logic as described above. For instance, the passphrase generation subsystem 202 may perform an intra-batch de-duplication by comparing the "Alpha-Ordered" version of each respective passphrase in the candidate batch 601 (except for the last passphrase) against the "Alpha-Ordered" version of the next-listed and/or prior-listed passphrase in order to evaluate whether the respective passphrase is duplicative of any other passphrase in the candidate batch 601. As a result of performing the intra-batch de-duplication, the passphrase generation subsystem 202 may identify two given passphrases "mouse chair wheel tube" and "wheel chair tube mouse", which are depicted in FIG. 6A with gray shading, as being duplicative. Thus, the passphrase generation subsystem 202 may remove one of the two given passphrases from the candidate batch 601. In this regard, the passphrase generation subsystem 202 may determine which of the two duplicate passphrases should be removed from the candidate batch 601 in various ways. As one possible example, the passphrase generation subsystem 202 may determine that the first-listed duplicate passphrase should remain in the candidate batch 601 and the second-listed duplicate passphrase should be removed. Other examples are also possible. As shown in FIG. 6A, the passphrase generation subsystem 202 has removed the "wheel chair tube mouse" duplicate passphrase from the candidate batch 601.

After completing the intra-batch de-duplication, the passphrase generation subsystem 202 may perform an inter-batch de-duplication as described above by comparing the "Alpha-Ordered" version of each respective passphrase remaining in the candidate batch 601 against an index 602 of alphabetically-ordered versions of active passphrases in order to evaluate whether the respective passphrase is duplicative of an active passphrase. In practice, the passphrase generation subsystem 202 may access the index 602 from the one or more data stores 210 of the direct mail system 201, and the index 602 may comprise alphabetically-ordered versions of both (i) previously-generated passphrases that have been released for use on direct mail and are not yet expired and (ii) previously-generated passphrases that have not yet been released for use on direct mail. It should be understood that the active passphrases and the index 602 of their corresponding "Alpha-Ordered" versions are shown side-by-side in FIG. 6A for illustrative purposes and that in practice, the index 602 of the active passphrases may be a stand-alone index.

As a result of performing the inter-batch de-duplication, the passphrase generation subsystem 202 may identify the "playful lying other story" passphrase in the candidate batch 601, which is depicted in FIG. 6A with gray shading, as being duplicative of an active passphrase having a duplicative alphabetical-ordered version, which is also depicted with gray shading. Thus, the passphrase generation subsystem 202 may remove the "playful lying other story" passphrase from the candidate batch 601. As shown in FIG. 6A, the initial number of passphrases in the candidate batch 601 may thus be reduced after the duplicate checking logic has been applied. After completing the de-duplication process, the passphrase generation subsystem 202 may optionally perform one or more other pre-processing operations discussed herein with reference to FIG. 5 and then designate the remaining passphrases in the candidate batch 601 as active passphrases that are to be provided to the passphrase mapping subsystem 203.

It should be understood that, in practice, the passphrase generation subsystem 202 may be configured to perform both of the aforementioned duplicate checks or may be configured to perform only one of these two duplicate checks, among other possibilities. Further, the passphrase generation subsystem 202 could be configured to perform other types of duplicate checks as well. As noted above, the passphrase generation subsystem 202 may then remove each passphrase in the candidate batch that is identified as a duplicate of either one or more passphrases in the candidate batch or as a duplicate of an active passphrase using one or more of the duplicate checks described above.

Returning to FIG. 5, as yet another possibility of applying pre-processing to the candidate batch, the passphrase generation subsystem 202 may apply a pre-processing operation that functions to filter the candidate batch of four-word passphrases based on the semantic meaning of the sequence of words in each passphrase. For instance, at block 510, the passphrase generation subsystem 202 may filter the four-word passphrases in the candidate batch to remove passphrases containing sequences of words that are considered to be "contentious" phrases. These contentious phrases may take various forms, including but not limited to sequences of words that convey a negative sentiment when combined together and/or sequences of words that are associated with a negative connotation when combined together. The passphrase generation subsystem 202 may identify passphrases having contentious phrases in various ways. As one possibility, the passphrase generation subsystem 202 may utilize one or more sentiment analyzer engines (e.g., Python NLTK, Stanford CoreNLP, etc.) to identify passphrases containing sequences of words that convey an overall negative sentiment and/or are associated with a negative connotation, and may then remove any such passphrases. In this respect, the passphrase generation subsystem 202 may apply the one or more sentiment analyzer engines to the passphrases themselves, the no-space versions of the passphrases, or some combination thereof. Other examples are possible as well.

In some examples, the pool of available words that is used by the passphrase generation subsystem 202 to generate the candidate batch as described above may be categorized (e.g., by the passphrase generation subsystem 202 or another subsystem of the direct mail system 201) such that words in the pool are grouped based on similar traits. For instance, words related to food (e.g., fruits, vegetables, etc.) may be grouped together in a first group, words related to athletics (e.g., sports, athletic equipment, etc.) may be grouped together in a second group, words related to animals (e.g., birds, cats, dogs, etc.) may be grouped together in a third group, and so on. The passphrase generation subsystem 202 may then generate a candidate batch of four-word passphrases based on the categorized pool of available words such that any given candidate passphrase comprises a set of words that have all been randomly selected from a same group in the available pool of words. Advantageously, this category-based approach for generating the candidate batch may reduce the likelihood of generated passphrases having undesirable semantic meanings. The passphrase generation subsystem 202 may apply one or more pre-processing operations on the generated candidate batch as previously described above.

In practice, the pre-processing operations described above may either be carried out in sequence, in parallel, or some combination thereof. For instance, in one possible implementation, the passphrase generation subsystem 202 may be configured to carry out the pre-processing operations of blocks 506-510 in a particular sequential order, such as the order in which these pre-processing operations are shown in FIG. 5. However, it should be understood that these pre-processing operations may also be carried out in any of various other sequential orders, and/or that some of all of the pre-processing operations may be carried out in parallel with one another.

Regardless of the particular implementation, after the pre-processing operations of blocks 506-510 have been carried out, the remaining four-word passphrases in the candidate batch may comprise four-word passphrases that are unique relative to one another (and relative to active four-word passphrases that include previously-generated passphrases that either have not yet been released or have been released and have not yet expired) and do not contain any restricted or contentious phrases.

Thereafter, at block 512, the passphrase generation subsystem 202 may designate the remaining four-word passphrases in the candidate batch as a new batch of four-word passphrases that may be available for use on direct mail, and this new batch of four-word passphrases may then be stored in the one or more data stores 210 of the direct mail system 201, such as a data store 210 that is configured to maintain a table (or the like) of active four-word passphrases generated by the passphrase generation subsystem 202. For instance, as one possibility, the four-word passphrases in the new batch may be added to an existing table that contains other active passphrases that have previously been generated by the passphrase generation subsystem 202. As another possibility, the four-word passphrases may be added to a new table that is separate from any existing table that contains active passphrases.

Along with the four-word passphrases themselves, other contextual information about the new four-word passphrases may also be stored in the one or more data stores 210 of the direct mail system 201. This contextual information may include various types of information.

As one possibility, the contextual information may include "status" information for the four-word passphrases, which may take various forms. As one possibility, a passphrase's release status may indicate that it has been released for use on direct mail (i.e., it has been provided to the passphrase mapping subsystem 203, either by being transmitted to the passphrase mapping subsystem 203 by the passphrase generation subsystem 202 or by being retrieved by the passphrase mapping subsystem 203 from the data store(s) 210). As another possibility, a passphrase's release status may indicate that it has not yet been released for use on direct mail. In this respect, when the new batch of four-word passphrases is first stored in the one or more data stores 210 of the direct mail system 201, the "status" information for the four-word passphrases in the new batch may indicate that each of the four-word passphrases is currently unreleased (e.g., a respective value for a release status field of each passphrase may indicate that the passphrase is "unreleased," "null," "n/a," or be left blank, etc.) and this "status" information may thereafter be updated if and when the four-word passphrases are provided to the passphrase mapping subsystem 203 for use on direct mail. The status information may take other forms as well.

As another possibility, the contextual information may include certain timing information related to the four-word passphrases. For example, the timing information may include a create date for the four-word passphrases in the new batch (e.g., a date populated by the passphrase generation subsystem 202 that indicates when each passphrase was generated). As another example, the timing information may include a release date for the four-word passphrases in the new batch. In practice, as previously mentioned, this release date may initially be blank for the new batch of four-word passphrases, but may later be populated (e.g., by the passphrase generation subsystem 202) when the new batch of four-word passphrases are provided, or "released," for use on direct mail. As yet another example, the timing information may include an expiration date for the four-word passphrases (e.g., an expiration date generated and populated by the passphrase generation subsystem 202), which may then dictate when the four-word passphrases will expire. In at least some implementations, this expiration date may be determined based on the release date, in which case this release date may initially be blank for the new batch of four-word passphrases and may then later be populated when the new batch of four-word passphrases are released for use on direct mail. For instance, a passphrase's expiration date may be set to a date that is some given period of time after the passphrase's release date (e.g., 12 months, 15 months, etc., from the release date). However, in other implementations, the passphrase generation subsystem 202 may use a passphrase's release date and the given period of time to determine the passphrase's expiration date, without storing that expiration date as part of the timing information. The timing information stored with the four-word passphrases may take other forms as well.

At a later time, if the passphrase generation subsystem 202 (or a different subsystem of the direct mail system 201) determines based on the timing information that certain passphrases have expired, those passphrases may be removed from the set of active passphrases (e.g., by deleting them from the data store that is configured to maintain the active four-word passphrases), thereby allowing those passphrases to be included in a future batch of generated passphrases.

Other contextual information about the new batch of four-word passphrases may be stored in the one or more data stores 210 of the direct mail system 201 as well.

To illustrate with a real-world example, consider the example shown in FIG. 6B. FIG. 6B depicts an example table of active passphrases 603 comprising the active passphrases previously discussed with respect to FIG. 6A as well as the remaining passphrases from the candidate batch 601, which have now been added to the table 603 as active passphrases. The new passphrases that formerly belonged to the candidate batch 601 are depicted in FIG. 6B with gray shading. In the example table shown in FIG. 6B, the active passphrases have been alphabetically sorted according to the passphrases' alphabetically-ordered version, but it should be understood that the active passphrases may be sorted in various other manners as well.

As shown in FIG. 6B, the table 603 may include, for each active four-word passphrase, a respective no-space version, a respective alphabetically-ordered version, a respective date when the passphrase was generated, a respective status of the passphrase, a respective release date for the passphrase, and a respective date of expiration for the passphrase. As shown in FIG. 6B, the "status" fields for the new passphrases formerly belonging to candidate batch 601 have an unreleased" value, indicating that those passphrases have not yet been provided for use on direct mail. Thus, the "date released" and "date of expiration" fields for those new passphrases have no values and are blank. Further, as shown in FIG. 6B, the "status" fields for certain of the passphrases that were previously generated have an unreleased" value, indicating that those passphrases have also not yet been provided for use on direct mail; thus, the corresponding "date released" and "date of expiration" fields for those passphrases have no values and are blank. Further yet, as shown in FIG. 6B, the "status" fields for certain other of the passphrases that were previously generated have a "released" value, which indicates that these passphrases have been released for use on direct mail, and also have corresponding release dates and expiration dates. At a later time, these passphrases may be removed from the table of active passphrases 603 upon reaching their date of expiration. The example table 603 may also include other information not shown in FIG. 6B.

Returning to FIG. 3, after generating the new batch of four-word passphrases as described above, at block 308, the passphrase generation subsystem 202 may provide the new batch of four-word passphrases for use on direct mail that is to be sent to intended recipients, which may take various forms. As one possibility, the passphrase generation subsystem 202 may provide the new batch of passphrases to the passphrase mapping subsystem 203 by transmitting the new batches of passphrases to the passphrase mapping subsystem 203 via a data communication. For example, the passphrase generation subsystem 202 may export a copy of the new batch of four-word passphrases to a transmittable data file (e.g., a spreadsheet) and then transmit a copy of to the file to the passphrase mapping subsystem 203. However, other mechanisms for transmitting the new batch of passphrases to the passphrase mapping subsystem 203 are possible as well, including mechanisms where the passphrases are encoded in some other manner. As another possibility, the passphrase generation subsystem 202 may provide the new batch of passphrases to the passphrase mapping subsystem 203 by virtue of storing the new batches of passphrases in a shared data store 210 that is accessible by the passphrase mapping subsystem 203, such that the new batch of passphrases may be retrieved by the passphrase mapping subsystem 203.

In some implementations, the passphrase generation subsystem 202 may also include, as part of the information that is provided to the passphrase mapping subsystem 203, an indication of a window of time (e.g., three months, six months, etc.) from the date when the passphrases were provided to the passphrase mapping subsystem 203) during which the new batch of four-word passphrases will remain valid for the passphrase mapping subsystem 203 to use direct mail that is sent to intended recipients. After that window of time has lapsed, the passphrases may become "invalid" and thus be unavailable for use on direct mail)

In practice, the new batch of four-word passphrases may be provided to the passphrase mapping subsystem 203 at any of various times. For instance, as one possibility, the new batch of four-word passphrases may be provided to the passphrase mapping subsystem 203 based on a pre-determined schedule that dictates when newly-generated passphrases are to be provided to the passphrase mapping subsystem 203 (e.g., biweekly, monthly, etc.). As another possibility, the new batch of four-word passphrases may be provided to the passphrase mapping subsystem 203 in response to receiving a request from the passphrase mapping subsystem 203. The passphrase generation subsystem 202 may provide the new batch of four-word passphrases according to some other trigger event as well.

After providing the new batch of four-word passphrases, the passphrase generation subsystem 202 may also update the data store 210 where the new batch of four-word passphrases are stored to indicate that the passphrases have been provided. For example, after the new passphrases of FIG. 6B are provided to the passphrase mapping subsystem 203, the "status" fields of those new passphrases may be updated from "unreleased" to "released," and the "date released" and "date of expiration" fields may be populated with a date when those passphrases were released to the passphrase mapping subsystem 203 and a date when those passphrases will expire, respectively.

After receiving the new batch of four-word passphrases, the passphrase mapping subsystem 203 may store the new passphrases along with contextual data related to the new passphrases. The new passphrases and the contextual data may be stored together in a data store 210, perhaps in the form of a table or the like, that is separate from the data store 210 that includes the active passphrases 603. Such contextual data may include various types of information.

As one possibility, the contextual data may include timing information for the new passphrases, which may take various forms. As one example, the timing information may include release information about when the new passphrases were released to the passphrase mapping subsystem 203. As another example, the timing information may include validity information about how long the passphrases will remain valid for use on direct mail. In practice, this validity information may be based at least partially on information provided to the passphrase mapping subsystem 203 by the passphrase generation subsystem 202, such as the window of time during which the passphrases will remain valid, which may be used by the passphrase mapping subsystem 203 to determine a "valid until" date for those passphrases. For example, if the window of time indicates that a passphrase is valid for use on direct mail up to three months after it has been released to the passphrase mapping subsystem 203, upon release of the passphrase, the passphrase mapping subsystem 203 may calculate a date that is three months from the date of release and store that date as the "valid until" date for that passphrase. The timing information may take other forms as well.

As another possibility, the contextual data may include "status" information for the new passphrases that have been received by the passphrase mapping subsystem 203, which may be different from the status information described above that is stored by the passphrase generation subsystem 202. Such status information may take various forms. As one possibility, the status information may indicate whether or not the passphrase mapping subsystem 203 has assigned a given passphrase to an intended recipient. As one example, the status information for a given passphrase may have an "assigned" value, indicating that the given passphrase may have been assigned to a respective intended recipient. As another example, the status information for a given passphrase may have an "unassigned" value, indicating that the given passphrase has not yet been assigned to an intended recipient and is available for assignment to an intended recipient. In practice, when the passphrase mapping subsystem 203 initially receives the new passphrases, the status information for those passphrases may be populated with an "unassigned" value indicating that those passphrases are available to be assigned to intended recipients. As another possibility, the status information may indicate that a given passphrase is no longer valid for use on direct mail—that is, the given passphrase's respective "valid until" date has lapsed. For example, the status information for a passphrase may have an "invalid" or "unavailable" value if that passphrase is no longer valid for use on direct mail. The status information may take other forms as well.

As yet another possibility, the contextual data that is stored by the passphrase mapping subsystem 203 for the new passphrases may include "assignment" information that serves to identify intended recipients for the new passphrases. This assignment information may identify the intended recipients either directly or indirectly and may take various forms. As one example, the assignment information may take the form of a unique invitation code identifier for a given invitation code that may have been previously mapped to a given intended recipient. The unique invitation code identifier may be cross-referenced by the passphrase mapping subsystem 203 to indirectly identify (e.g., based on information stored in the data store(s) 210 about invitation codes) the given invitation code and transitively, the given intended recipient. As another example, the assignment information may take the form of a unique recipient identifier for a given intended recipient to which a given passphrase has been assigned and that may be utilized by the passphrase mapping subsystem 203 to directly identify (e.g., from information stored in the data store(s) 210 about intended recipients) the given intended recipient. The assignment information may take other forms as well. In practice, the assignment information may depend on the status information described above. For instance, for new passphrases that have an "unassigned" status, the assignment information may be blank or otherwise unpopulated until after those passphrases have been assigned to intended recipients. Thereafter, the assignment information may be updated with recipient information that identifies the intended recipients.

Returning again to FIG. 3, after receiving the new batch of four-word passphrases from the passphrase generation subsystem 202, at block 310, the passphrase mapping subsystem 203 may assign the four-word passphrases to intended recipients. The passphrase mapping subsystem 203 may carry out this assignment in various manners.

For instance, in one implementation, the passphrase mapping subsystem 203 may first generate numeric/alphanumeric invitation codes and assign those numeric/alphanumeric invitation codes to intended recipients of direct mail. In this respect, the passphrase mapping subsystem 203 may have access to information about the intended recipients to whom direct mail is to be sent, such as profile information (e.g., name and residence information), which passphrase mapping subsystem 203 may use to assign the generated numeric/alphanumeric invitation codes to intended recipients. The passphrase mapping subsystem 203 may then "map" the passphrases that are provided by the passphrase generation subsystem 202 to the previously generated and assigned numeric/alphanumeric invitation codes, which thereby serves to assign the passphrases to the intended recipients. For instance, the passphrase mapping subsystem 203 may (i) access a set of released passphrases that have been generated by the passphrase generation subsystem 202 and (ii) map each respective passphrase in the accessed set to a respective numeric/alphanumeric invitation code that has been assigned to a respective intended recipient and thereby associate the respective passphrase with the respective intended recipient.

In another implementation, the passphrase mapping subsystem 203 may assign the passphrases that have been generated by the passphrase generation subsystem 202 to intended recipients without previously generating or using any numeric/alphanumeric invitation codes. For instance, the passphrase mapping subsystem 203 may (i) access a set of released passphrases (e.g., a listing of active passphrases) that have been generated and provided by the passphrase generation subsystem 202, (ii) identify a set of intended recipients to which passphrases are to be assigned (e.g., based on profile data that is accessible to the passphrase mapping subsystem 203), and then (iii) assign each respective passphrase in the accessed set to a respective one of the intended recipients in the identified set.

It should be understood that the passphrase mapping subsystem 203 may assign the passphrases generated by the passphrase generation subsystem 202 to intended recipients of direct mail in other manners as well.

In addition to assigning the passphrases generated by the passphrase generation subsystem 202 to intended recipients of direct mail, the passphrase mapping subsystem 203 may store, in the data store(s) 210, assignment information regarding the passphrase-intended-recipient assignments. This assignment information may take various forms. In general, the assignment information for each passphrase may comprise any information that serves to indicate an association between the passphrase and the intended recipient. As mentioned above, such assignment information may take various forms. As one example, the assignment information may comprise recipient information, such as a unique recipient identifier, that serves to directly identify a given intended recipient to which direct mail including the passphrase is to be sent. As another example, the assignment information may include invitation code information, such as a unique invitation code identifier, that indicates a given invitation code that has previously been assigned to a given intended recipient, which serves to directly identify of the given intended recipient.

To illustrate, consider the example shown in FIG. 6C, which depicts an example table 604 containing certain passphrases that have been released to the passphrase mapping subsystem 203. As shown, the table 604 may include, for each of the released passphrases, a "date released" indicating when the passphrases were released to the passphrase mapping subsystem 203, a "date valid until" by which the passphrase mapping subsystem 203 may assign the new passphrases to intended recipients before the passphrases become invalid and unavailable for use, a "status" indicating the current status of the passphrases at the passphrase mapping subsystem 203, which may indicate whether the passphrases are unassigned, assigned, or invalid, and for passphrases that have been assigned, "assignment" information that indicates (either directly or indirectly, as previously discussed) intended recipients to which those passphrases have been assigned.

As shown in the example of FIG. 6C, the new passphrases from former candidate batch 601 that were previously added to the table of active passphrases 603 now have corresponding release dates and valid until dates, indicating that those passphrases have been provided to the passphrase mapping subsystem 203. However, the "status" fields for those passphrases indicate that those passphrases remain "unassigned" and are thus available to be assigned to intended recipients. Further, as shown in FIG. 6C, the other active passphrases that were previously unreleased with reference to FIG. 6B now have populated "date released" and "date valid until" fields, indicating that those passphrases have been released and also mapped to intended recipients, which is in turn indicated by the "status" field values for those passphrases being updated to "assigned" and the "assignment" field values for those passphrases being updated to indicate the intended recipients to which those passphrases were assigned. In practice, after a given passphrase has been mapped and its status information has been updated to indicate that it is "assigned," it may become ineligible for assignment until a future instance when the given passphrase is provided to the passphrase mapping subsystem 203 as part of a future new batch of passphrases, if such an instance should ever occur.

As further shown in FIG. 6C, one given passphrase "purpose lying tortoise sky" in the table 604, depicted in italicized font, has an "invalid" status field value, thereby indicating that the passphrase mapping subsystem 203 failed to assign that passphrase to an intended recipient prior to that passphrase's "valid until" date. In practice, if a given passphrase has not been assignment prior to its "valid until" date, it may become ineligible for assignment until a future instance when the given passphrase is provided to the passphrase mapping subsystem 203 as part of a future new batch of passphrases, if such an instance should ever occur.

After assigning the generated passphrases to the intended recipients, the passphrase mapping subsystem 203 may provide some set of information (referred to herein as a "direct mail data set") about certain intended recipients of direct mail along with their assigned passphrases and respective offer information to the mail generation subsystem 204 for use in generating, printing, and sending the direct mail to those intended recipients. The direct mail data set provided to the mail generation subsystem 204 may include various types of information. As one possibility, the direct mail data set may include recipient information about the intended recipients to whom the direct mail is to be sent. For instance, as one example, the recipient information may include profile information such as names and addresses for the intended recipients. As another example, the recipient information may include recipient identifiers that can be used by the mail generation subsystem 204 to retrieve (e.g., from the data store(s) 210) more detailed information, such as names and addresses, for the intended recipients. The recipient information may include other types of information as well. As another possibility, the direct mail data set may include respective offer information for each intended recipient that is to be included on the direct. Such offer information may take the form of textual information that sets forth terms of an offer for an intended recipient or may take the form of an offer identifier that can be used by the mail generation subsystem 204 to retrieve more detailed information about the offer (e.g., by accessing the data store(s) 210). As yet another possibility, the direct mail data set may include each intended recipient's assigned passphrase that is to be included on the direct mail. The direct mail data set may include other types of information as well.

The manner in which the passphrase mapping subsystem 203 provides the direct mail data set to the mail generation subsystem 204 may take various forms. As one possibility, the passphrase mapping subsystem 203 may transmit a data communication comprising the direct mail data set to the mail generation subsystem 204. As another possibility, the passphrase mapping subsystem 203 may store the direct mail data set at the data store(s) 210 for retrieval by the mail generation subsystem 204. In such an instance, the direct mail system 201 may cause a notification to be sent to the mail generation subsystem 204 when a new direct mail data set is available for retrieval. The direct mail data set may be provided to the mail generation subsystem 204 in other ways as well.

FIG. 6D depicts on possible example of an example direct mail data set 605 that may be provided to the mail generation subsystem 204 by the passphrase generation subsystem 203. In line with the discussion above, the data set 605 may include information about intended recipients to whom direct mail is to be sent. Such information may include each intended recipient's name and address information. Further, the data set 605 may include offer information for each intended recipient that is to be included on the direct mail. Further yet, the data set 605 may include each intended recipient's assigned passphrase for inclusion on the direct mail. The direct mail data set 605 may include additional information not shown in FIG. 6D.

Returning to FIG. 3, at block 312, the mail generation subsystem 204 may then use the direct mail data set provided from the passphrase mapping subsystem 203 including information about the intended recipients, their respective offers, and their assigned passphrases to generate direct mail that is to be sent to the intended recipients. Each piece of direct mail generated by the mail generation subsystem 204 may include at least (i) an identification of a given intended recipient, (ii) an address for the given intended recipient where the direct mail is to be sent, (iii) information about an offer being extended to the intended recipient, and (iv) the intended recipient's assigned passphrase (and perhaps also the assigned invitation code) for redeeming that offer. The direct mail may also include information about the organization that is extending the offer and perhaps also instructions for claiming the offer. Thereafter, the generated direct mail may be printed and sent out to the intended recipients.

FIG. 7 depicts an example 700 of one such piece of direct mail that may be generated by the mail generation subsystem 204. As shown, the example direct mail 700 includes (i) information about an offer 701, (ii) a unique four-word passphrase 702, and (iii) instructions 703 for claiming the offer 701 using the passphrase 702. Although not shown in FIG. 7, the example direct mail 700 may also include an identification and address of a given recipient for which the direct mail 700 is intended.

The mail generation subsystem 204 may then cause the generated direct mail to be printed and coordinate transmission of the direct mail to the intended recipients. In some implementations, the direct mail may coordinate with another subsystem of the direct mail system 201, or perhaps a system external to the direct mail system 201 (such as a third-party mailing service), to send the direct mail to the intended recipients.

After the direct mail is generated, printed, and sent out to the intended recipients, certain of those recipients may then use their assigned four-word passphrases to pursue the offer set forth in their direct mail. To do so, some of the recipients may contact the organization by phone and relay the passphrases over the phone. Other recipients may utilize client devices, such as example client devices 206, to access the offer processing subsystem 205 over a data network 207 (e.g., via a web application or a mobile application running on a client device) and input their assigned four-word passphrases to claim and/or obtain more information about their offer. When an intended recipient inputs their assigned four-word passphrase, the offer processing subsystem 205 may receive an indication that the assigned four-word passphrase has been entered and may then facilitate further interactions between the intended recipient and the direct mail system 201 for pursuing and/or claiming the offer.

Returning to FIG. 3, as shown at block 314, the offer processing subsystem 205 may receive an indication that a given passphrase assigned to a given intended recipient has been entered. The offer processing subsystem 205 may then use the given passphrase to facilitate interactions between the direct mail system 201 and the given intended recipient, which may involve providing the given intended recipient with more information about the offer included in the direct mail sent to the given intended recipient, assisting the given intended recipient with claiming the offer included in the direct mail, such as by providing a graphical user interface (GUI) that includes an application for claiming the offer that has been pre-populated with information about the given intended recipient, and/or providing the given intended recipient with information about other offers for which the intended recipient may be eligible, among other possibilities. To facilitate further interactions with the given intended recipient, the offer processing subsystem 205 may obtain information about the intended recipients, which may take various forms. As one possibility, after receiving an indication that a given passphrase was entered, the offer processing subsystem 205 may communicate with one or more other subsystems of the direct mail system 201, such as the passphrase mapping subsystem 203, to obtain information about a given intended recipient to whom the given passphrase is assigned, and perhaps also information about the offer for the given intended recipient. As another possibility, the offer processing subsystem 205 may access the data store(s) 210 to obtain recipient and/or offer information associated with the given passphrase. Such information may include, for example, the given intended recipient's name and address information, details about the offer (e.g., if the offer pertains to a credit card account, such information may include a given Annual Percentage Rate ("APR %") offer that is available to the given intended recipient, a pre-screen date indicating when the given intended recipient was determined to be eligible for that APR % offer, a duration for which the APR % is applicable, etc.), and perhaps even information about the direct mail that was sent to the given intended recipient (e.g., design information about the direct mail, etc.). Other examples are also possible.

The offer processing subsystem 205 may facilitate interactions between the direct mail system 201 and the given intended recipient through various means, such as by connecting the given intended recipient with a representative over the phone, or by causing a client device associated with the intended recipient to display a GUI that (i) enables the intended recipient to input their associated four-word passphrase and (ii) guides the intended recipient through a process for further pursuing the offer (e.g., by submitting an application to claim the offer).

The GUI driven by the offer processing subsystem 205 may initially direct an intended recipient to a landing page that enables entry of the recipient's assigned four-word passphrase. The GUI may be configured to apply certain rules during entry of the generated four-word passphrase that reflect the characteristics of the assigned four-word passphrase. For example, the GUI may require entry of four words, each having between four to eight characters, that collectively comprise an assigned four-word passphrase. After detecting that a given four-word passphrase has been entered, the offer processing subsystem 205 may (i) identify the given individual to which the given four-word passphrase has been assigned (e.g., based on information stored in the one or more data stores indicating the mapping between passphrases and intended recipients of direct mail), (ii) retrieve profile and/or offer information for the given individual, and (iii) pre-populate information into one or more fields of a GUI view to be presented to the given individual, such as one or more fields for inputting information about the given individual or information about the offer for which the intended recipient is eligible.

In some instances, an intended recipient may inadvertently make an entry error while entering the four-word passphrase. In response, the GUI may display one or more visual indications and/or text guidance that alerts the intended recipient to the entry error and perhaps also provides information about how to rectify the entry error.

FIGS. 8A-8I depict example snapshot views of a GUI that may be displayed to an intended recipient when an entry error is detected by the offer processing subsystem 205. Each of FIGS. 8A-8I depicts two corresponding versions of a given example snapshot view of the GUI as it may be displayed by different types of client devices. For example, a first version "Display A" may depict the given example snapshot as it may be displayed on a smartphone and a second version "Display B" may depict the given example snapshot as it may be displayed on a computer or tablet.

FIG. 8A depicts an example snapshot view 800 of a landing page of the GUI that may be displayed to an intended recipient. The snapshot view 800 prompts the intended recipient to input their associated four-word passphrase into a set of input fields corresponding to each word of the four-word passphrase and begin a process to pursue the offer in their direct mail. FIG. 8B depicts an example snapshot view 820 of the GUI after the intended recipient has input their four-word passphrase. FIG. 8C depicts a snapshot view 830 of the GUI after the intended recipient has input their four-word passphrase and selected a GUI element "Start Your Application" to begin the process to pursue the offer. As shown in FIG. 8C, the intended recipient may have made an error while inputting the four-word passphrase, and the GUI may have thus included a visual indicator that alerts the intended recipient that an input error has occurred. The visual indicator may take various forms, including a particular icon, a particular shape, a particular color, or a combination thereof. Further, the form of the visual indicator may depend on the type and/or severity of the user error. For example, the visual indicator may take a first shape and/or color to indicate that an inputted word has a typographical error, and may take a second shape and/or color to indicate that an inputted word does not meet some threshold criteria (e.g., minimum character requirement, etc.). Other examples are also possible. As shown in FIG. 8C, the visual indicator 831 may take the form of an exclamation mark within a yellow circle.

Figure 8F:
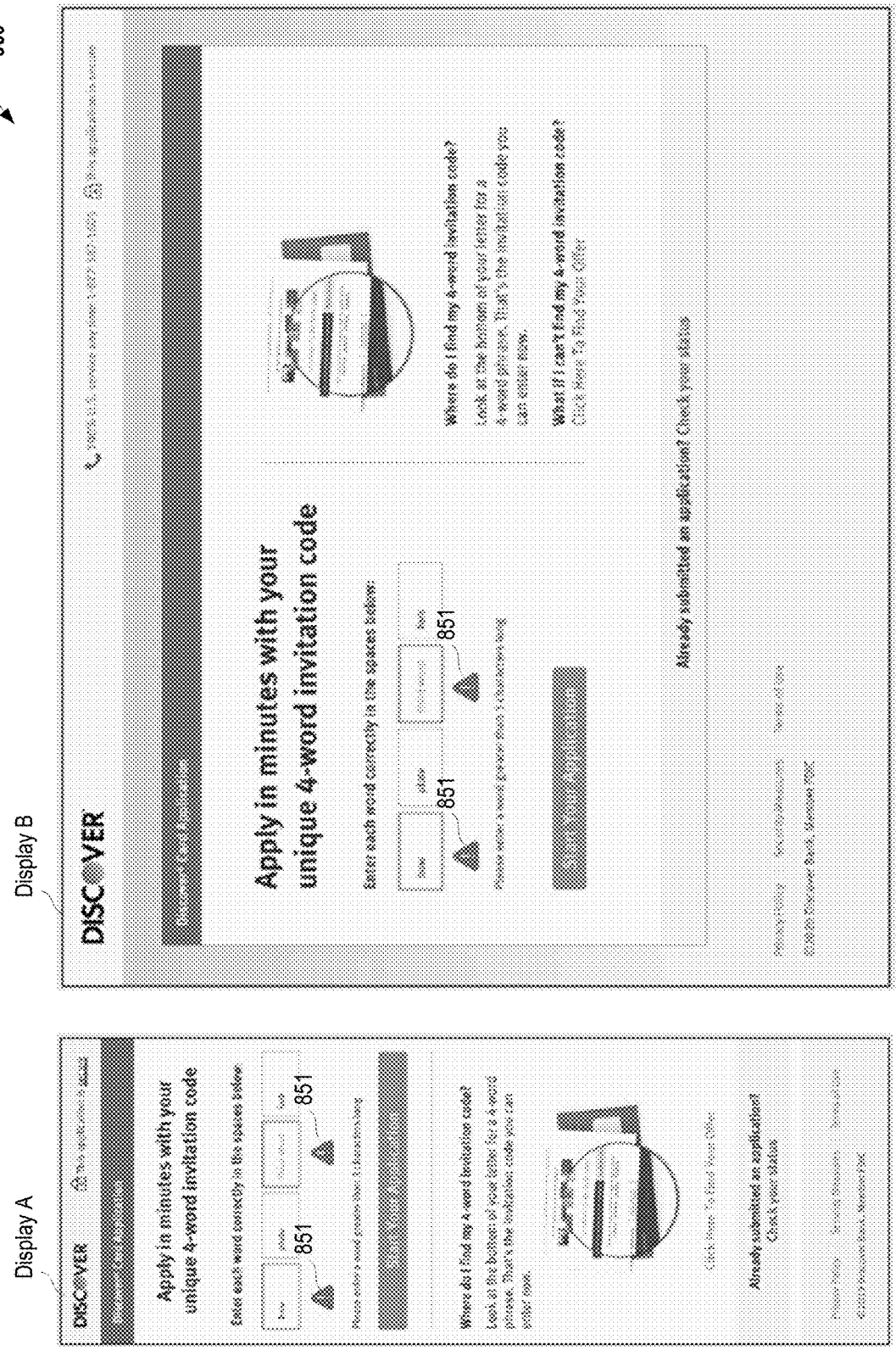
Figure 8G:
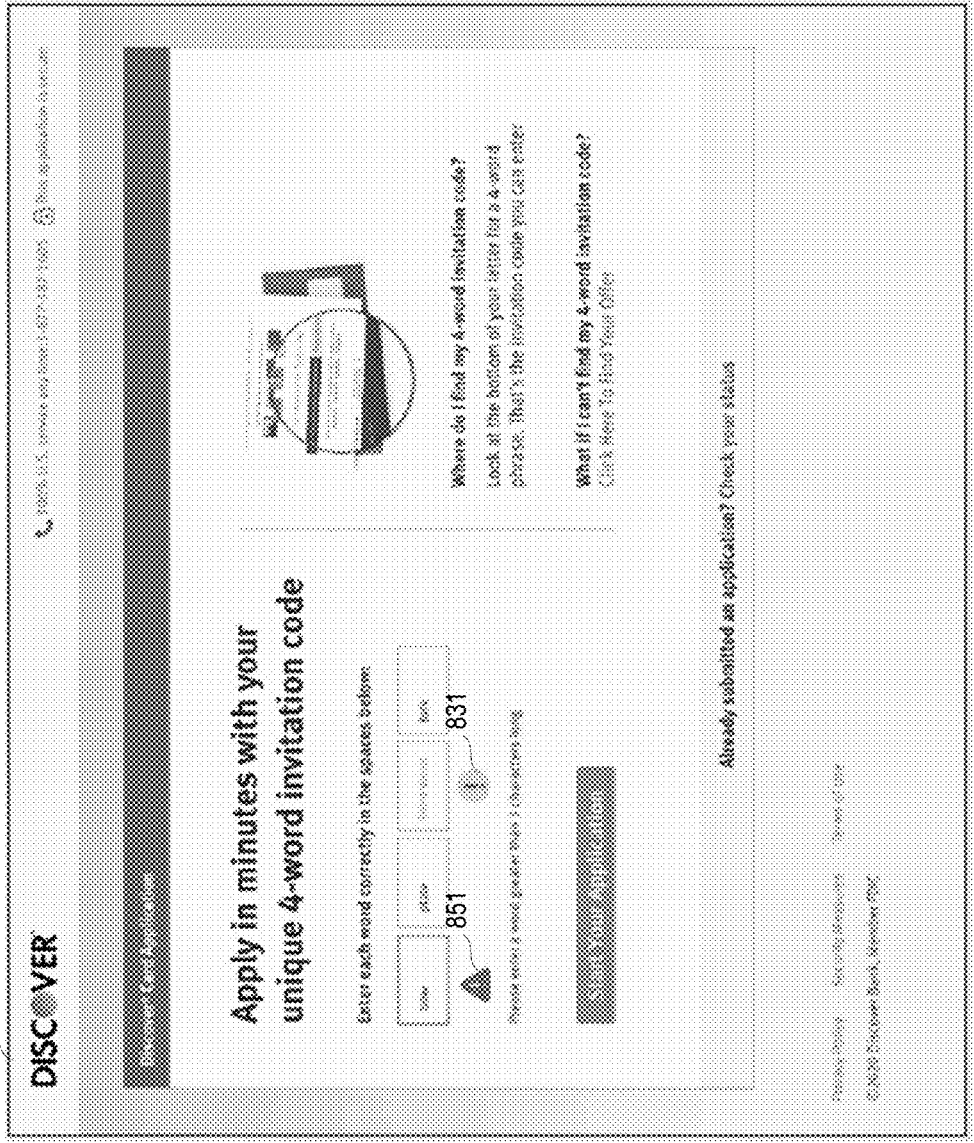
Figure 8I:
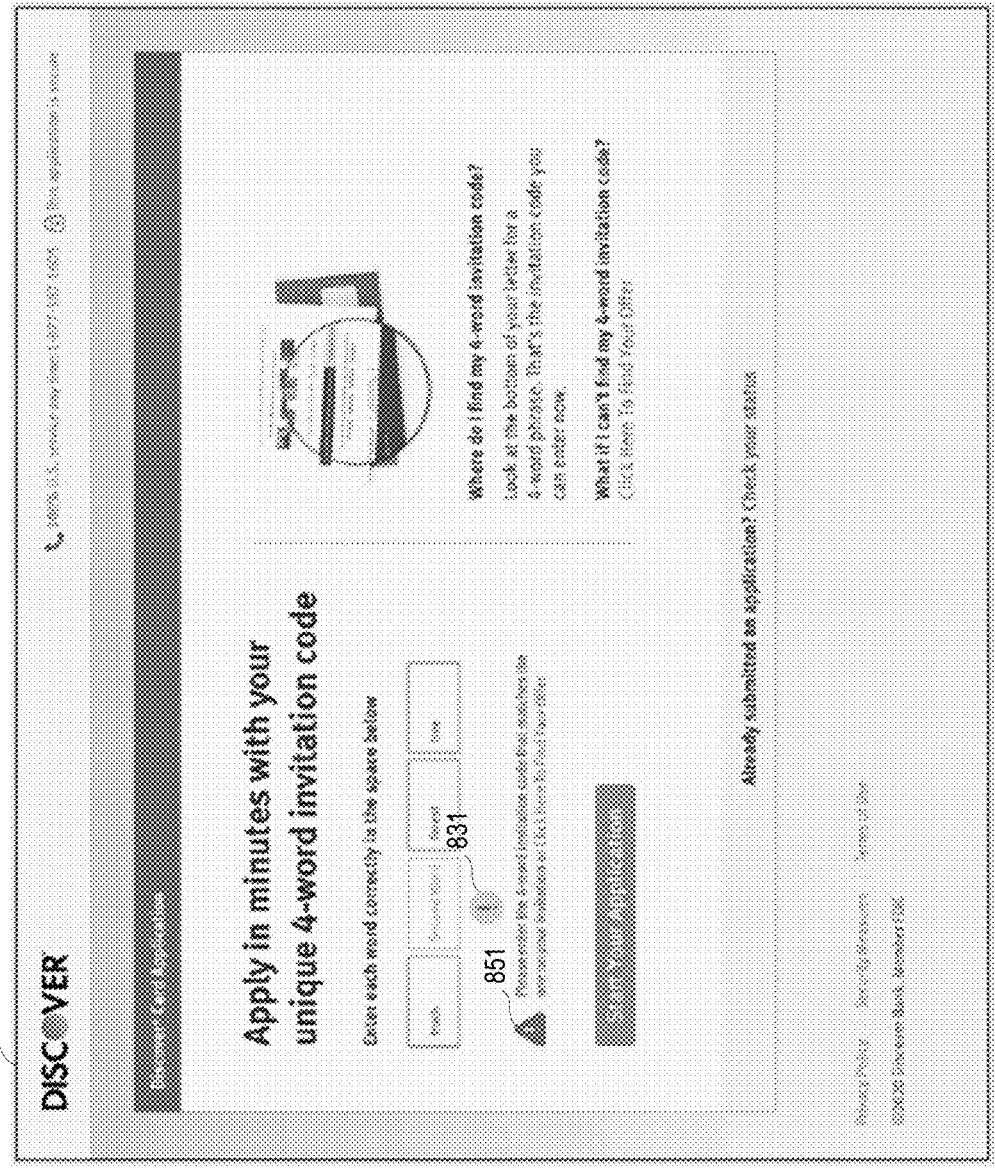

FIG. 8D depicts a snapshot view 840 of the GUI that includes an additional visual indicator 831 that alerts the intended recipient of a further user error. FIG. 8E depicts a snapshot view 850 of the GUI that includes a visual indicator 851 that takes the form of an exclamation mark within a red triangle. As shown, the visual indicator 851 is accompanied by text guidance informing the intended recipient how to address the input errors. FIG. 8F depicts a snapshot view 860 of the GUI that includes an additional visual indicator 851 that alerts the intended recipient to an additional error and is accompanied by text guidance regarding the input errors. FIG. 8G depicts a snapshot view 870 of the GUI that includes a first visual indicator 731 and a second visual indicator 851 accompanied by instructions to provide the intended recipient with alerts and text guidance regarding the entry errors. FIG. 8H depicts a snapshot view 880 of the GUI that includes a visual indicator 851 alerting the intended recipient that an input error has occurred and providing text guidance on how to rectify the input errors. FIG. 8I depicts a snapshot view 890 of the GUI that includes a first visual indicator 831 and a second visual indicator 851 accompanied by text guidance on how to rectify the input errors.

The GUI that is displayed to an intended recipient may take other forms as well.

For the example process 300 of FIG. 3, and other processes described herein including the example processes 400 shown in FIGS. 4 and 500 shown in FIG. 5, the flowcharts show functionality and operation of one possible implementation of embodiments disclosed herein. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the example processes 300, 400, and 500, each block shown in FIGS. 3, 4, and 5A may represent circuitry that is wired to perform the specific logical functions in the process.

Figure 9:
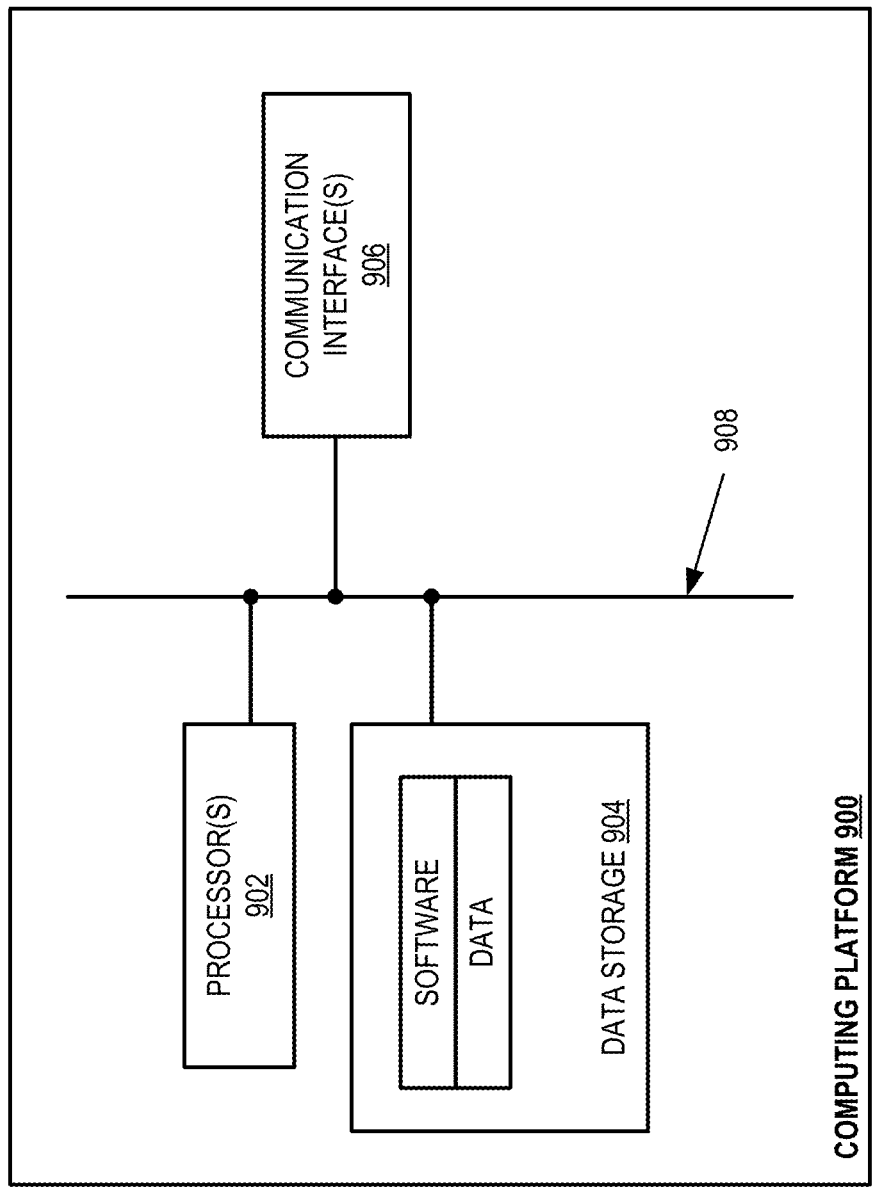
FIG. 9 depicts example structural components of an example computing platform that is configured to implement on or more processes in accordance with the disclosed technology.

Turning now to FIG. 9, a simplified block diagram is provided to illustrate some structural components that may be included in an example computing platform 900 that may be configured to carry out any of the various functions disclosed herein, including but not limited to the functions of any one or more of the passphrase generation subsystem 202, the passphrase mapping subsystem 203, the mail generation subsystem 204, or the offer processing subsystem 205. At a high level, the computing platform 900 may generally comprise any one or more computing systems that collectively include one or more processors 902, data storage 904, and one or more communication interfaces 906, all of which may be communicatively linked by a communication link 908 that may take the form of a system bus, a communication network such as a public, private, or hybrid cloud, or some other connection mechanism. Each of these components may take various forms.

The one or more processors 902 may each comprise one or more processing components, such as general-purpose processors (e.g., a single- or a multi-core central processing unit (CPU)), special-purpose processors (e.g., a graphics processing unit (GPU), application-specific integrated circuit, or digital-signal processor), programmable logic devices (e.g., a field programmable gate array), controllers (e.g., microcontrollers), and/or any other processor components now known or later developed. In line with the discussion above, it should also be understood that the one or more processors 902 could comprise processing components that are distributed across a plurality of physical computing systems connected via a network.

In turn, the data storage 904 may comprise one or more non-transitory computer-readable storage mediums that are collectively configured to store (i) program instructions that are executable by one or more processors 902 such that computing platform 900 is configured to perform any of the various functions disclosed herein, and (ii) data that may be received, derived, or otherwise stored, for example, in one or more databases, file systems, repositories, or the like, by computing platform 900, in connection with performing any of the various functions disclosed herein. In this respect, the one or more non-transitory computer-readable storage mediums of the data storage 904 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that the data storage 904 may comprise computer-readable storage mediums that are distributed across a plurality of physical computing systems connected via a network.

The one or more communication interfaces 906 may be configured to facilitate wireless and/or wired communication with other systems and/or devices, such as client devices (e.g., one or more client devices 206 of FIG. 2). Additionally, in an implementation where the computing platform 900 comprises a plurality of physical computing systems connected via a network, the one or more communication interfaces 906 may be configured to facilitate wireless and/or wired communication between these physical computing systems (e.g., between computing and storage clusters in a cloud network). As such, the one or more communication interfaces 906 may each take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for any of various types of wireless communication (e.g., Wi-Fi communication, cellular communication, short-range wireless protocols, etc.) and/or wired communication. Other configurations are possible as well.

Although not shown, the computing platform 900 may additionally include or have an interface for connecting to one or more user-interface components that facilitate user interaction with the computing platform 900, such as a keyboard, a mouse, a trackpad, a display screen, a touch-sensitive interface, a stylus, a virtual-reality headset, and/or one or more speaker components, among other possibilities.

It should be understood that the computing platform 900 is one example of a computing platform that may be used with the embodiments described herein. Numerous other arrangements are possible and contemplated herein. For instance, in other embodiments, the computing platform 900 may include additional components not pictured and/or more or fewer of the pictured components.

Figure 10:
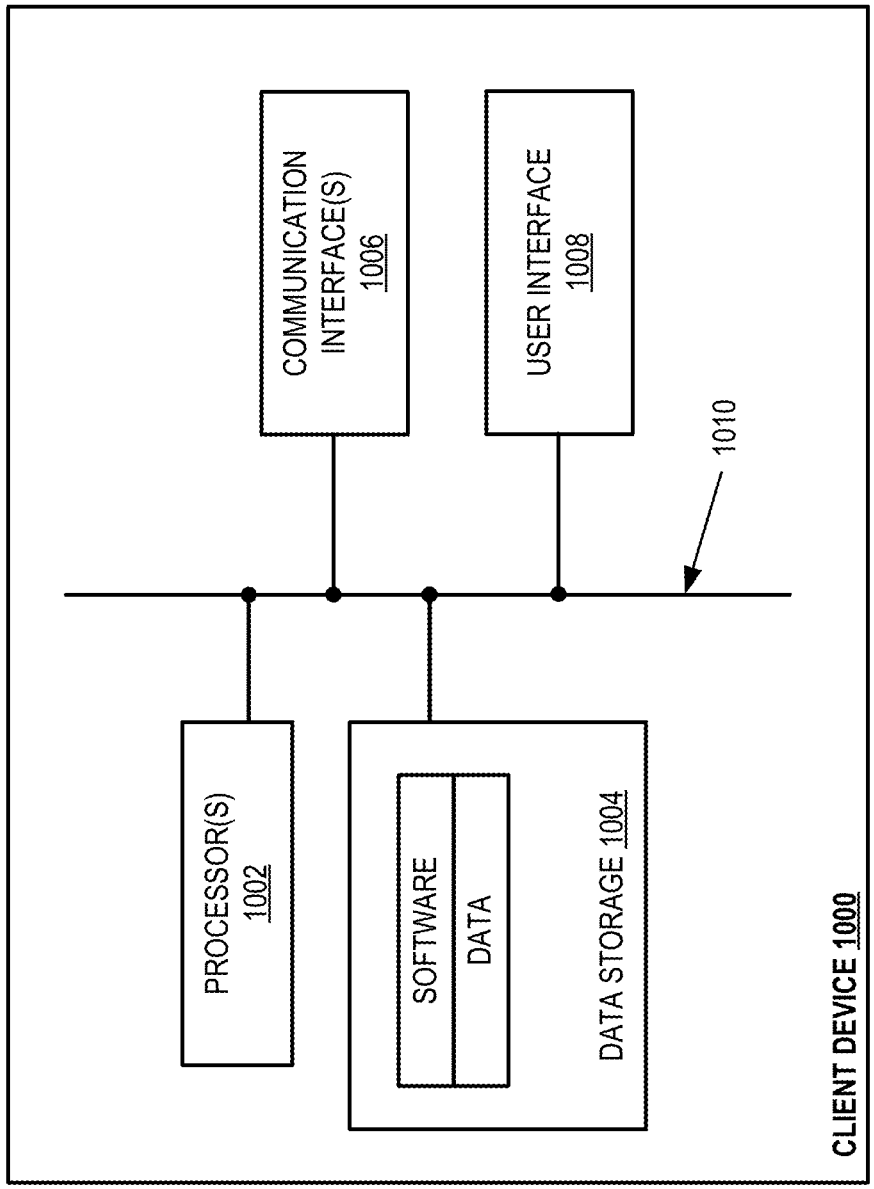
FIG. 10 depicts example structural components of an example client device that is configured to implement on or more processes in accordance with the disclosed technology.

Turning next to FIG. 10, a simplified block diagram is provided to illustrate some structural components that may be included in an example client device 1000 that may access and communicate with a computing platform that is configured to host and execute the new software technology disclosed herein, such as the computing platform 900 of FIG. 9. As shown in FIG. 10, the client device 1000 may include one or more processors 1002, data storage 1004, one or more communication interfaces 1006, and a user interface 1008, all of which may be communicatively linked by a communication link 1010 that may take the form of a system bus or some other connection mechanism. Each of these components may take various forms.

The one or more processors 1002 may comprise one or more processing components, such as general-purpose processors (e.g., a single- or a multi-core CPU), special-purpose processors (e.g., a GPU, application-specific integrated circuit, or digital-signal processor), programmable logic devices (e.g., a field programmable gate array), controllers (e.g., microcontrollers), and/or any other processor components now known or later developed.

In turn, data storage 1004 may comprise one or more non-transitory computer-readable storage mediums that are collectively configured to store (i) program instructions that are executable by the processor(s) 1002 such that the client device 1000 is configured to perform certain functions related to interacting with and accessing services provided by a computing platform, and (ii) data that may be received, derived, or otherwise stored, for example, in one or more databases, file systems, repositories, or the like, by the client device 1000, related to interacting with and accessing services provided by a computing platform. In this respect, the one or more non-transitory computer-readable storage mediums of data storage 1004 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. Data storage 1004 may take other forms and/or store data in other manners as well.

The one or more communication interfaces 1006 may be configured to facilitate wireless and/or wired communication with other computing devices. The communication interface(s) 1006 may take any of various forms, examples of which may include an Ethernet interface, a serial bus interface (e.g., Firewire, USB 3.0, etc.), a chipset and antenna adapted to facilitate wireless communication, and/or any other interface that provides for any of various types of wireless communication (e.g., Wi-Fi communication, cellular communication, short-range wireless protocols, etc.) and/or wired communication. Other configurations are possible as well.

The client device 1000 may additionally include a user interface 1008 for connecting to one or more user-interface components that facilitate user interaction with the client device 1000, such as a keyboard, a mouse, a trackpad, a display screen, a touch-sensitive interface, a stylus, a virtual-reality headset, and/or one or more speaker components, among other possibilities.

It should be understood that the client device 1000 is one example of a client device that may be used to interact with an example computing platform as described herein. Numerous other arrangements are possible and contemplated herein. For instance, in other embodiments, the client device 1000 may include additional components not pictured and/or more or fewer of the pictured components.

CONCLUSION

This disclosure makes reference to the accompanying figures and several example embodiments of the disclosed innovations that have been described above. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and sprit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

We claim:

1. A computing platform that generates four-word passphrases for inclusion on printed direct mail, the computing platform comprising:
   at least one processor;
   at least one non-transitory computer-readable medium; and
   program instructions stored on the at least one non-transitory computer-readable medium that are executable by the at least one processor such that the computing platform is configured to:
obtain a pool of available words for use in generating four-word passphrases;
generate a candidate batch of four-word passphrases using the pool of available words;
identify one or more duplicate four-word passphrases in the candidate batch and then filter the identified one or more duplicate four-word passphrases out of the candidate batch, wherein identifying the one or more duplicate four-word passphrases in the candidate batch comprises: (i) utilizing a first duplicate-identification process that identifies duplicate four-word passphrases among the four-word passphrases of the candidate batch and (ii) utilizing a second duplicate-identification process that identifies duplicate four-word passphrases between the four-word passphrases of the candidate batch and active four-word passphrases previously generated by the computing platform for inclusion on printed direct mail;
based on the filtered candidate batch of four-word passphrases, generate a new batch of four-word passphrases; and
release the new batch of four-word passphrases, wherein at least a subset of the released four-word passphrases are thereafter included on printed direct mail.

2. The computing platform of claim 1, further comprising program instructions stored on the at least one non-transitory computer-readable medium that are executable by the at least one processor such that the computing platform is configured to:
before obtaining the pool of available words for use in generating four-word passphrases, generate the pool of available words by (i) obtaining a word corpus, (ii) filtering certain words out of the word corpus, and (iii) based on the filtered word corpus, generating the pool of available words.

3. The computing platform of claim 2, wherein filtering certain words out of the word corpus comprises one or more of:
filtering words out of the word corpus based on one or both of a minimum character requirement or a maximum character requirement;
filtering words out of the word corpus that have spaces or special characters;
filtering words out of the word corpus based on parts of speech;
filtering words out of the word corpus that belong to a set of restricted words; or
filtering words out of the word corpus that are determined to be contentious.

4. The computing platform of claim 1, wherein the program instructions that are executable by the at least one processor such that the computing platform is configured to identify the one or more duplicate four-word passphrases in the candidate batch comprise program instructions stored on the at least one non-transitory computer-readable medium that are executable by the at least one processor such that the computing platform is configured to:
create a no-space version of each four-word passphrase in the candidate batch;
evaluate the no-space version of each four-word passphrase in the candidate batch against (i) the no-space versions of the other four-word passphrases in the candidate batch and (ii) no-space versions of any other active four-word passphrases; and
based on the evaluation, identify, as part of the one or more duplicate four-word passphrases, each four-word passphrase in the candidate batch having a no-space version that matches a no-space version of either another four-word passphrase in the candidate batch or another active four-word passphrase.

5. The computing platform of claim 1, wherein the program instructions that are executable by the at least one processor such that the computing platform is configured to identify the one or more duplicate four-word passphrases in the candidate batch comprise program instructions stored on the at least one non-transitory computer-readable medium that are executable by the at least one processor such that the computing platform is configured to:
create an alphabetical-ordered version of each four-word passphrase in the candidate batch;
evaluate the alphabetical-ordered version of each four-word passphrase in the candidate batch against (i) the alphabetical-ordered versions of the other four-word passphrases in the candidate batch and (ii) alphabetical-ordered versions of any other active four-word passphrases; and
based on the evaluation, identify, as part of the one or more duplicate four-word passphrases, each four-word passphrase in the candidate batch having an alphabetical-ordered version that matches an alphabetical-ordered version of either another four-word passphrase in the candidate batch or another active four-word passphrase.

6. The computing platform of claim 1, further comprising program instructions stored on the at least one non-transitory computer-readable medium that are executable by the at least one processor such that the computing platform is configured to:
store the new batch of four-word passphrases along with timing information that enables determination of an expiration date for the four-word passphrases in the new batch.

7. The computing platform of claim 6, further comprising program instructions stored on the at least one non-transitory computer-readable medium that are executable by the at least one processor such that the computing platform is configured to:
based at least in part on the timing information, determine that at least a subset of the four-word passphrases in the new batch have expired; and
in response to determining that the subset of the four-word passphrases in the new batch have expired, remove the subset of the four-word passphrases from storage.

8. The computing platform of claim 1, further comprising program instructions stored on the at least one non-transitory computer-readable medium that are executable by the at least one processor such that the computing platform is configured to:
assign the new batch of four-word passphrases to intended recipients of the direct mail; and
for each of the intended recipients, generate respective direct mail that describes an offer to the intended recipient and includes the intended recipient's assigned four-word passphrase.

9. The computing platform of claim 8, further comprising program instructions stored on the at least one non-transitory computer-readable medium that are executable by the at least one processor such that the computing platform is configured to:
receive an indication that a given intended recipient's assigned four-word passphrase has been utilized to pursue an offer described in the respective direct mail generated for the given intended recipient; and after receiving the indication, cause the given intended recipient to be presented with additional information regarding the offer.

10. The computing platform of claim 9, wherein the offer described in the respective direct mail generated for the given intended recipient comprises an offer to apply for a credit card, and wherein the program instructions that are executable by the at least one processor such that the computing platform is configured to cause the given intended recipient to be presented with the additional information regarding the offer comprise program instructions stored on the at least one non-transitory computer-readable medium that are executable by the at least one processor such that the computing platform is configured to:

cause the given intended recipient to be presented with a pre-populated application form for the credit card.

11. At least one non-transitory computer-readable medium, wherein the at least one non-transitory computer-readable medium is provisioned with program instructions for generating four-word passphrases for inclusion on printed direct mail that, when executed by at least one processor, cause a computing platform to:

obtain a pool of available words for use in generating four-word passphrases;

generate a candidate batch of four-word passphrases using the pool of available words;

identify one or more duplicate four-word passphrases in the candidate batch and then filter the identified one or more duplicate four-word passphrases out of the candidate batch, wherein identifying the one or more duplicate four-word passphrases in the candidate batch comprises: (i) utilizing a first duplicate-identification process that identifies duplicate four-word passphrases among the four-word passphrases of the candidate batch and (ii) utilizing a second duplicate-identification process that identifies duplicate four-word passphrases between the four-word passphrases of the candidate batch and active four-word passphrases previously generated by the computing platform for inclusion on printed direct mail;

based on the filtered candidate batch of four-word passphrases, generate a new batch of four-word passphrases; and release the new batch of four-word passphrases, wherein at least a subset of the released four-word passphrases are thereafter included on printed direct mail.

12. The at least one non-transitory computer-readable medium of claim 11, wherein the at least one non-transitory computer-readable medium is also provisioned with program instructions that, when executed by at least one processor, cause the computing platform to:

before obtaining the pool of available words for use in generating four-word passphrases, generate the pool of available words by (i) obtaining a word corpus, (ii) filtering certain words out of the word corpus, and (iii) based on the filtered word corpus, generating the pool of available words.

13. The at least one non-transitory computer-readable medium of claim 12, wherein the program instructions that, when executed by at least one processor, cause the computing platform to generate the pool of available words by filtering certain words out of the word corpus comprise program instructions that, when executed by at least one processor, cause the computing platform to generate the pool of available words by performing one or more of:

filtering words out of the word corpus based on one or both of a minimum character requirement or a maximum character requirement;

filtering words out of the word corpus that have spaces or special characters;

filtering words out of the word corpus based on parts of speech;

filtering words out of the word corpus that belong to a set of restricted words; or filtering words out of the word corpus that are determined to be contentious.

14. The at least one non-transitory computer-readable medium of claim 11, wherein the program instructions that, when executed by at least one processor, cause the computing platform to identify the one or more duplicate four-word passphrases in the candidate batch comprise program instructions that, when executed by at least one processor, cause the computing platform to:

create a no-space version of each four-word passphrase in the candidate batch;

evaluate the no-space version of each four-word passphrase in the candidate batch against (i) the no-space versions of the other four-word passphrases in the candidate batch and (ii) no-space versions of any other active four-word passphrases; and based on the evaluation, identify, as part of the one or more duplicate four-word passphrases, each four-word passphrase in the candidate batch having a no-space version that matches a no-space version of either another four-word passphrase in the candidate batch or another active four-word passphrase.

15. The at least one non-transitory computer-readable medium of claim 11, wherein the program instructions that, when executed by at least one processor, cause the computing platform to identify the one or more duplicate four-word passphrases in the candidate batch comprise program instructions that, when executed by at least one processor, cause the computing platform to:

create an alphabetical-ordered version of each four-word passphrase in the candidate batch;

evaluate the alphabetical-ordered version of each four-word passphrase in the candidate batch against (i) the alphabetical-ordered versions of the other four-word passphrases in the candidate batch and (ii) alphabetical-ordered versions of any other active four-word passphrases; and based on the evaluation, identify, as part of the one or more duplicate four-word passphrases, each four-word passphrase in the candidate batch having an alphabetical-ordered version that matches an alphabetical-ordered version of either another four-word passphrase in the candidate batch or another active four-word passphrase.

16. The at least one non-transitory computer-readable medium of claim 11, wherein the at least one non-transitory computer-readable medium is also provisioned with program instructions that, when executed by at least one processor, cause the computing platform to:

assign the new batch of four-word passphrases to intended recipients of the direct mail; and for each of the intended recipients, generate respective direct mail that describes an offer to the intended recipient and includes the intended recipient's assigned four-word passphrase.

17. The at least one non-transitory computer-readable medium of claim 16, wherein the at least one non-transitory computer-readable medium is also provisioned with program instructions that, when executed by at least one processor, cause the computing platform to:

receive an indication that a given intended recipient's assigned four-word passphrase has been utilized to pursue an offer described in the respective direct mail generated for the given intended recipient; and after receiving the indication, cause the given intended recipient to be presented with additional information regarding the offer.

18. The at least one non-transitory computer-readable medium of claim 17, wherein the offer described in the respective direct mail generated for the given intended recipient comprises an offer to apply for a credit card, and wherein the program instructions that, when executed by at least one processor, cause the computing platform to cause the given intended recipient to be presented with the additional information regarding the offer comprise program instructions that, when executed by at least one processor, cause the computing platform to:

cause the given intended recipient to be presented with a pre-populated application form for the credit card.

19. A method carried out by a computing platform for generating four-word passphrases for inclusion on printed direct mail, the method comprising:

obtaining a pool of available words for use in generating four-word passphrases;

generating a candidate batch of four-word passphrases using the pool of available words;

identifying one or more duplicate four-word passphrases in the candidate batch and then filtering the identified one or more duplicate four-word passphrases out of the candidate batch, wherein identifying the one or more duplicate four-word passphrases in the candidate batch comprises: (i) utilizing a first duplicate-identification process that identifies duplicate four-word passphrases among the four-word passphrases of the candidate batch and (ii) utilizing a second duplicate-identification process that identifies duplicate four-word passphrases between the four-word passphrases of the candidate batch and active four-word passphrases previously generated by the computing platform for inclusion on printed direct mail;

based on the filtered candidate batch of four-word passphrases, generating a new batch of four-word passphrases; and releasing the new batch of four-word passphrases, wherein at least a subset of the released four-word passphrases are thereafter included on printed direct mail.

20. The method of claim 19, further comprising:

before obtaining the pool of available words for use in generating four-word passphrases, generating the pool of available words by (i) obtaining a word corpus, (ii) filtering certain words out of the word corpus, and (iii) based on the filtered word corpus, generating the pool of available words.

\* \* \* \* \*